(12) United States Patent
Hayashi et al.

(10) Patent No.: US 6,987,593 B2
(45) Date of Patent: Jan. 17, 2006

(54) OPTICAL SCANNING DEVICE AND IMAGE FORMING APPARATUS USING THE SAME

(75) Inventors: Yoshinori Hayashi, Kanagawa (JP); Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 21 days.

(21) Appl. No.: 10/382,530

(22) Filed: Mar. 7, 2003

(65) Prior Publication Data

US 2003/0214693 A1   Nov. 20, 2003

(30) Foreign Application Priority Data

| Mar. 8, 2002 | (JP) | ............................. 2002-063129 |
| Sep. 20, 2002 | (JP) | ............................. 2002-276314 |

(51) Int. Cl.
*G02B 26/08* (2006.01)

(52) U.S. Cl. ...................... 359/205; 359/204; 359/207; 347/244

(58) Field of Classification Search ........ 359/204–207; 347/243–244

See application file for complete search history.

(56) References Cited

U.S. PATENT DOCUMENTS

| 5,784,094 | A | * | 7/1998 | Ota et al. .................... 347/243 |
| 6,081,386 | A | | 6/2000 | Hayashi et al. |
| 6,100,912 | A | * | 8/2000 | Shiraishi et al. ............ 347/233 |
| 6,185,026 | B1 | | 2/2001 | Hayashi et al. |
| 6,198,562 | B1 | | 3/2001 | Hayashi et al. |
| 6,317,246 | B1 | | 11/2001 | Hayashi et al. |
| 6,369,927 | B2 | | 4/2002 | Hayashi et al. |
| 6,400,391 | B1 | | 6/2002 | Suhara et al. |
| 6,445,482 | B1 | | 9/2002 | Hayashi et al. |
| 6,462,853 | B2 | | 10/2002 | Hayashi |
| 6,509,995 | B1 | | 1/2003 | Suzuki et al. |
| 6,573,921 | B2 | | 6/2003 | Hayashi et al. |
| 2001/0055140 | A1 | | 12/2001 | Sakai et al. |
| 2002/0105707 | A1 | | 8/2002 | Hayashi |

FOREIGN PATENT DOCUMENTS

JP            9-054263           2/1997

(Continued)

OTHER PUBLICATIONS

U.S. Appl. No/ 10/053,272, filed Jan. 17, 2002, inventor: Y. Hayashi.
U.S. Appl. No. 09/791,407, filed Feb. 22, 2001, inventor: K. Sakai, et al.

*Primary Examiner*—James Phan
(74) *Attorney, Agent, or Firm*—Oblon, Spivak, McClelland, Maier & Neustadt, P.C.

(57) ABSTRACT

An optical scanning device deflects, by a common optical deflecting part, a plurality of groups of light beams emitted from a plurality of light sources and directs, by a scanning and imaging optical system, the groups of deflected light beams to respective scan surfaces so as to optically scan the scan surfaces. Each of the groups of light beams deflected by the optical deflecting part passes through at least two scanning lenses while being directed to a corresponding one of the scan surfaces. A first scanning lens arranged nearest to the optical deflecting part among the scanning lenses transmits the groups of light beams directed to the respective scan surfaces and satisfies Pm>0≧Ps, where Pm is a power in a main scanning direction and Ps is a power in a sub-scanning direction. A second scanning lens arranged nearest to the corresponding scan surface among the scanning lenses possesses a positive power in the sub-scanning direction and transmits only the group of light beams directed to the corresponding scan surface.

11 Claims, 15 Drawing Sheets

FOREIGN PATENT DOCUMENTS

| | | | | | |
|---|---|---|---|---|---|
| JP | 9-127443 | 5/1997 | JP | 2001-010107 | 1/2001 |
| JP | 11-157128 | 6/1999 | JP | 2001-033720 | 2/2001 |
| JP | 2001-004948 | 1/2001 | JP | 2001-343603 | 12/2001 |

* cited by examiner

FIG.1A
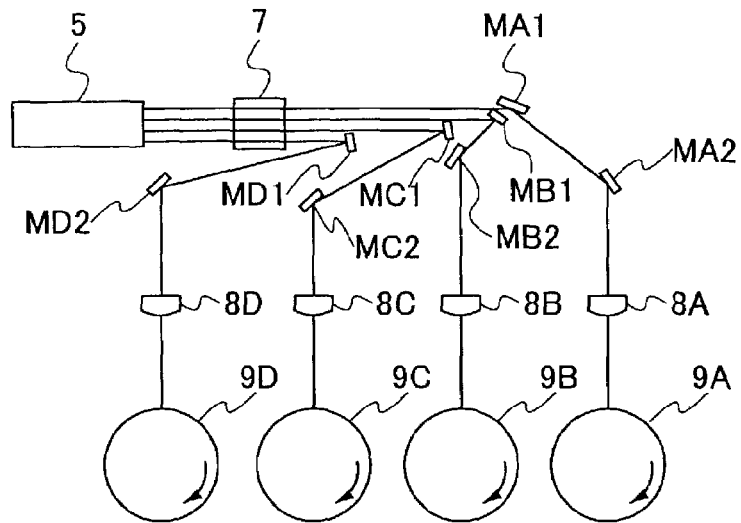
FIG.1B
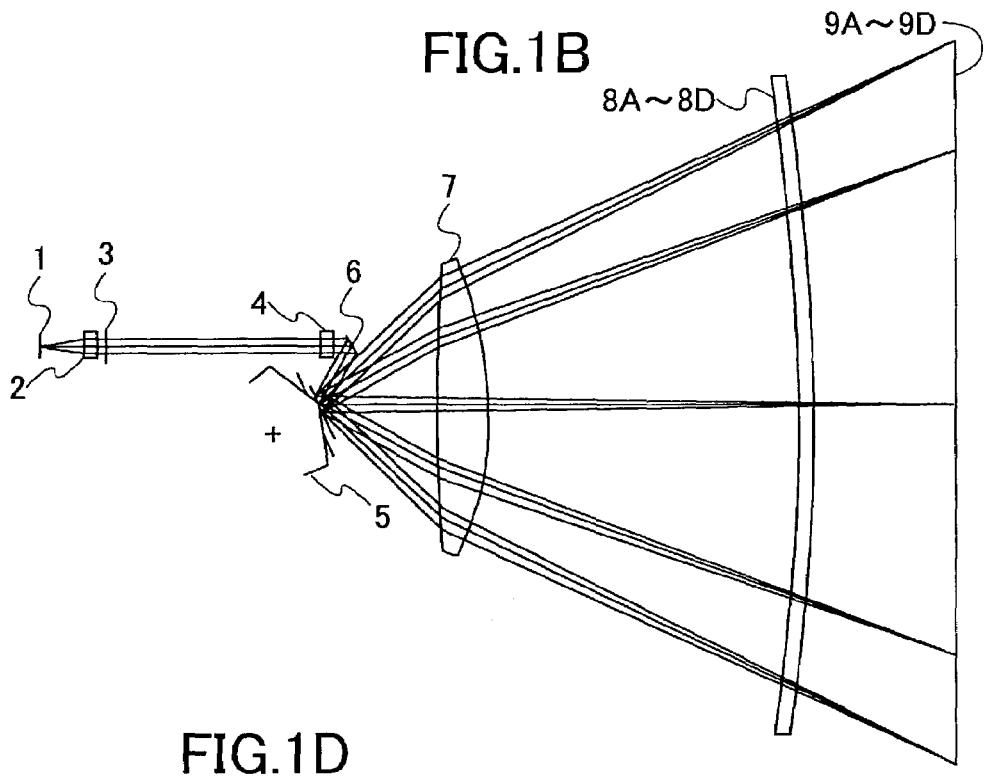
FIG.1D
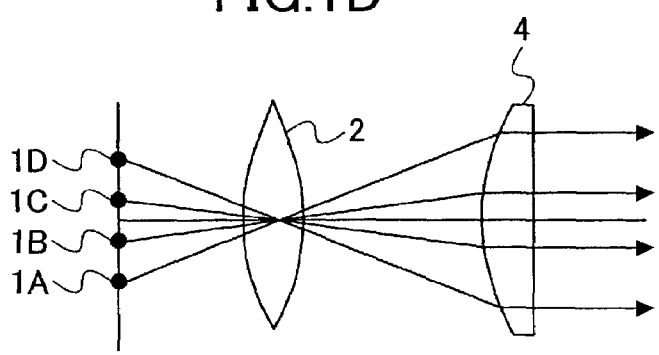
FIG.1C

FIG.9A
FIG.9B
FIG.9C
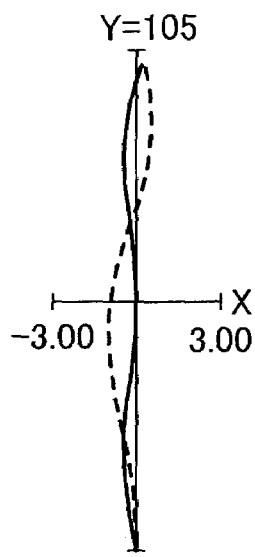
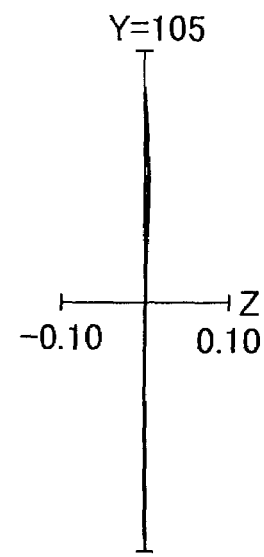
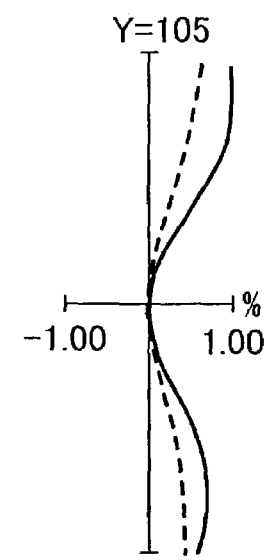
FIG.10A
FIG.10B
FIG.10C
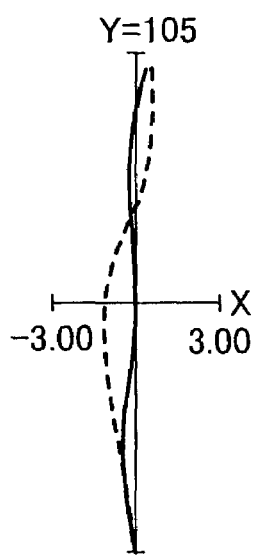
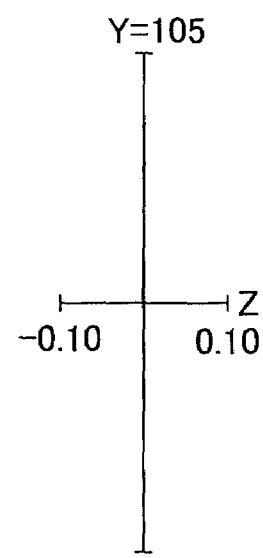
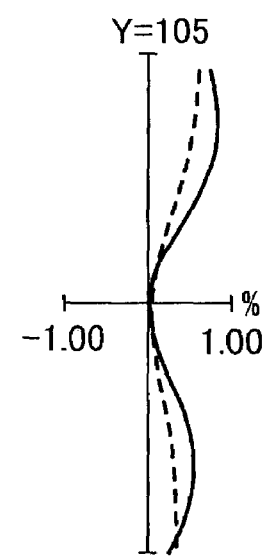

FIELD CURVATURE

FIELD CURVATURE

OPTICAL SCANNING DEVICE AND IMAGE FORMING APPARATUS USING THE SAME

BACKGROUND OF THE INVENTION

1. Field of the Invention

The present invention generally relates to optical scanning devices and image forming apparatuses.

2. Description of the Related Art

Optical scanning devices forming a beam spot on a surface to be scanned (hereinafter referred to as a "scan surface") and optically scanning the scan surface with the beam spot, and image forming apparatuses using such an optical scanning device are widely known in association with image forming apparatuses such as an optical printer (laser printer), optical plotter (laser plotter), digital copying machine and facsimile machine. In such optical scanning devices, the beam spot is formed through deflecting a light beam from the light source side by an "optical deflecting part" such as a rotary polygon mirror, and focusing the deflected light beam toward the scan surface by a "scanning and imaging optical system" such as an f$\theta$ lens.

Recently, not only optical scanning devices that optically scan one scan surface, but also optical scanning devices that simultaneously and optically scan a plurality of scan surfaces are in practical use. In other words, in addition to an optical scanning device using a conventional single beam scanning method, an optical scanning device using a multi-beam scanning method is being-realized as the optical scanning device used for the image forming apparatus. As for the image forming apparatus, besides an image forming apparatus forming a monochrome image, an image forming apparatus forming a color image and a multicolor image is coming into practical use. Especially, a "tandem-type" image forming apparatus is actively being developed (refer to Japanese Laid-Open Patent Applications No. 11-157128, No. 9-127443, No. 9-54263, No. 2001-4948, No. 2001-10107 and No. 2001-33720).

In addition, "sharing in common a part of an optical system that forms light paths from light sources to respective (different) scan surfaces" for optically scanning a plurality of scan surfaces is performed (for example, Japanese Laid-Open Patent Applications No. 2001-4948, No. 2001-10107, No. 2001-33720 and No. 2001-343603).

Higher density writing by optical scanning devices is being developed, and realization of writing densities of 1200 dpi, 1600 dpi and higher is intended. In order to achieve high-density writing, the stability of a beam spot, that is, "to prevent the spot diameter of a beam spot, which optically scans a scan surface, from being greatly varied according to image height" is essential.

One of the causes for the variation of the spot diameter of the beam spot according to image height is, as is generally known, "field curvature caused by the scanning and imaging optical system". There are a large number of known "scanning and imaging optical systems substantially correcting the field curvature" so as to increase the stability of the beam spot.

In an optical scanning device using the multi-beam scanning method, in addition to the stability of the beam spot, it is also important that imaging magnification of the scanning and imaging optical system, which focuses deflected light beams on a scan surface, be substantially constant.

SUMMARY OF THE INVENTION

It is a general object of the present invention to provide an improved and useful optical scanning device and image forming apparatus using the optical scanning device in which the above-mentioned problems are eliminated.

It is another and more specific object of the present invention to provide a novel optical scanning device that optically scans a plurality of scan surfaces simultaneously by light beams emitted from a plurality of light sources, and uses in common a part of an optical system forming light paths from the light sources to the respective (different) scan surfaces.

It is still another object of the present invention to provide a novel optical scanning device suitable for optically scanning one scan surface.

It is a further object of the present invention to provide a novel image forming apparatus using the optical scanning device as described above.

It is a still further object of the present invention to provide an optical scanning device having good stability of a beam spot and high stability of the imaging magnification of a scanning and imaging optical system, and an image forming apparatus using such an optical scanning device.

In order to achieve the above-mentioned objects, according to one aspect of the present invention, there is provided an optical scanning device, including: a plurality of light sources emitting a plurality of groups of light beams; an optical deflecting part deflecting the plurality of groups of light beams emitted from the plurality of light sources; a plurality of scan surfaces to be optically scanned; and a scanning and imaging optical system directing the plurality of groups of deflected light beams to said respective scan surfaces so as to optically scan said scan surfaces, each of the plurality of groups of light beams deflected by said optical deflecting part passes through at least two scanning lenses while being directed to a corresponding one of the scan surfaces, a first scanning lens arranged nearest to said optical deflecting part among said scanning lenses transmits the plurality of groups of light beams directed to the respective scan surfaces and satisfies Pm>0$\geq$Ps, where Pm is a power in a main scanning direction of said first scanning lens and Ps is a power in a sub-scanning direction of said first scanning lens, and a second scanning lens arranged nearest to the corresponding scan surface among said scanning lenses possesses a positive power in the sub-scanning direction and transmits only one of the plurality of groups of light beams directed to the corresponding scan surface.

It is preferable that the first scanning lens does not possess a power in the sub-scanning direction. It is also preferable that the second scanning lens have a substantially constant thickness in the optical axis direction within an effective area (a lens area in the main scanning direction corresponding to an effective optical scanning area in optical scan). Further, it is preferable that the conjugate lateral magnification $\beta$ in the sub-scanning direction between the point of deflection of the optical deflecting part and the scan surfaces satisfies a condition: $|\beta|<1.2$.

Additionally, according to another aspect of the present invention, there is provided an image forming apparatus optically scanning at least one photosensitive medium so as to form an image and including the optical scanning device as described above.

In addition, according to another aspect of the present invention, there is provided an optical scanning device, including: a plurality of light sources emitting a plurality of groups of light beams; a deflecting part deflecting the plurality of groups of light beams emitted from the plurality of light sources; a plurality of scan surfaces to be optically scanned; and a scanning and imaging optical system directing the plurality of groups of deflected light beams to said respective scan surfaces so as to optically scan said scan surfaces, said scanning and imaging optical system including: a first type scanning lens satisfying Pm>0≧Ps, where Pm is a power in a main scanning direction of said first type scanning lens and Ps is a power in a sub-scanning direction of said first type scanning lens, and transmitting the plurality of groups of light beams directed to said respective scan surfaces; and a second type scanning lens having a positive power in the sub-scanning direction and transmitting one of the plurality of groups of light beams directed to a corresponding one of said scan surfaces, wherein all scanning lenses arranged on light paths from said optical deflecting part to said scan surfaces are one of said first and second type scanning lenses.

For example, in a case where the scanning and imaging optical system includes three scanning lenses, one of the scanning lenses is the first type scanning lens, another is the second type scanning lens, and the other is either the first or second type scanning lens.

It is preferable that the first type scanning lens do not possess a power in the sub-scanning direction. It is also preferable that the second type scanning lens having a substantially constant thickness in the optical axis direction within the above-described effective area. Further, it is preferable that the conjugate lateral magnification β in the sub-scanning direction between the point of deflection of the optical deflecting part and the scan surfaces satisfies a condition: |β|<1.2.

In addition, according to another aspect of the present invention, there is provided an image forming apparatus optically scanning at least one photosensitive medium so as to form an image and including the optical scanning device as described above.

Further, according to another aspect of the present invention, there is provided an optical scanning device, including: a light source emitting a light beam; an optical deflecting part deflecting the light beam emitted from said light source; a scan surface to be optically scanned; and a scanning and imaging optical system directing the deflected light beam to said scan surface so as to perform optical scan, said scanning and imaging optical system including two scanning lenses, a first scanning lens of said two scanning lenses being nearer to the optical deflecting part and having a power only in a main scanning direction, and a second scanning lens, of said two scanning lenses, being nearer to said scan surface and satisfying |(1/Rm1)+(1/Rm2)|·L<0.1, where Rm1 is a radius of curvature in the main scanning direction of an entering surface of said second scanning lens, Rm2 is a radius of curvature in the main scanning direction of an exiting surface of said second scanning lens, and L is an optical path length from a point of deflection of said optical deflecting part to the scan surface.

In the optical scanning device according to the above-mentioned aspect of the present invention, it is preferable that the second lens have a substantially constant thickness in the optical direction within the above-described effective area.

Additionally, according to another aspect of the present invention, there is provided an image forming apparatus optically scanning at least one photosensitive medium so as to form an image and including the optical scanning device as mentioned above.

According to the present invention, a novel optical scanning device and image forming apparatus can be achieved. In the optical scanning device according to the present invention, the scanning lens that transmits a plurality of light beams directed to respective scan surfaces does not possess a positive power in the sub-scanning direction. Thus, light beam separation can be easily performed. Accordingly, a plurality of light beams can be closely arranged in the sub-scanning direction on a reflection (deflection) surface of the optical deflecting part so as to make the reflection (deflection) surface of the optical deflecting part smaller, resulting in a smaller and lighter optical deflecting part. Hence, it is possible to achieve a cost saving, more quiet, more ruggedized, and low-power-consuming optical scanning device.

In the optical scanning device according to the present invention, the power of the scanning lens nearer to the optical deflecting part in the scanning and imaging optical system is 0, and the shape thereof in a main scanning cross section does not vary in the sub-scanning direction. Thus, the constant velocity characteristics are not degraded even when the scanning lens is shifted in the sub-scanning direction. Also, the imaging performance in the main scanning direction is not degraded. Further, even when the scanning lens nearer to the optical deflecting part has a local defect such as contamination, since there is no optical axis with respect to the sub-scanning direction, it is possible to arrange the scanning lens by choosing the best sub-scanning position.

Accordingly, the image forming apparatus of the present invention using such an optical scanning device can perform good image forming.

Additionally, according to another aspect of the present invention, there is provided an optical scanning device, including: a light source emitting light beams; a deflecting part deflecting the light beams from said light source; a scan surface; a scanning and imaging lens directing the light beams deflected by said deflecting part to said scan surface and focusing the light beams onto said scan surface as a beam spot, said scanning and imaging lens including two or more scanning lenses, a scanning lens nearest to said deflecting part among said scanning lenses having a positive power in a main scanning direction and a substantially zero refracting power in a sub-scanning direction, and a scanning lens nearest to said scan surface among said scanning lenses having a negative refracting power in the main scanning direction and a positive refracting power in the sub-scanning direction.

The "main scanning cross section" is a hypothetical plane cross section including the optical axis of the scanning lens and being parallel to the main scanning direction. A hypothetical plane cross section that is orthogonal to the main scanning direction is referred to as a "sub-scanning cross section".

In addition, according to another aspect of the present invention, there is provided an image forming apparatus optically scanning a photosensitive medium so as to form an image and including the optical scanning device as described above.

Further, according to another aspect of the present invention, there is provided a tandem-type image forming apparatus including the optical scanning device as described above.

According to the present invention, it is possible to realize a novel optical scanning device and image forming apparatus. The optical scanning device according to the present invention can substantially correct a curvature field in the main scanning direction and in the sub-scanning direction and realize a stable beam spot while maintaining good "constant velocity functions (functions of achieving constant velocity) such as fθ functions". Accordingly, the image forming apparatus using such an optical scanning device can realize a good image forming.

Other objects, features and advantages of the present invention will become more apparent from the following detailed description when read in conjunction with the following drawings.

BRIEF DESCRIPTION OF THE DRAWINGS

FIGS. 1A, 1B, 1C and 1D are schematic diagrams for explaining a first embodiment of an optical scanning device and an image forming apparatus according to the present invention;

FIGS. 9A, 9B and 9C are aberration diagrams relating to Embodiment 3;

FIGS. 10A, 10B and 10C are aberration diagrams relating to Embodiment 4;

DETAILED DESCRIPTION OF THE PREFERRED EMBODIMENTS

Figure 2A:
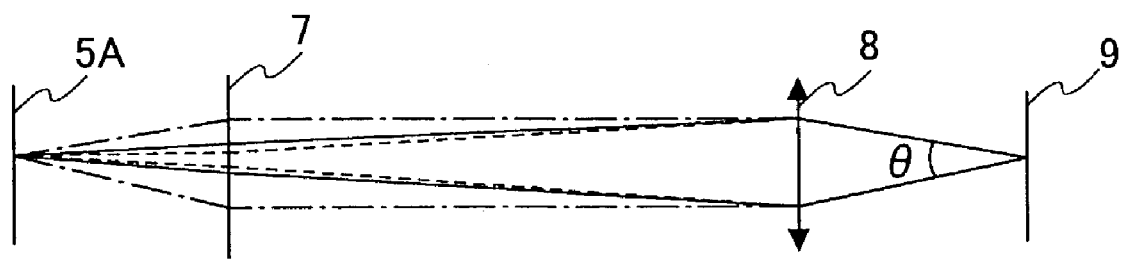
FIGS. 2A, 2B and 2C are schematic diagrams for explaining Conditions (1) and (4)

A description will be given of embodiments of the present invention.

FIGS. 1A through 1D are diagrams for explaining a first embodiment of an image forming apparatus according to the present invention.

FIG. 1A shows an arrangement of the optical system starting with a polygon mirror (an optical deflecting part) 5, which is a rotary polygon mirror and serves as an optical deflecting means.

In this embodiment, four groups of light beams emitted from four light sources are deflected by the same (common) polygon mirror 5, which is the optical deflecting means. As described above, when optical scanning is performed using a multi-beam scanning method, each of the four groups of light beams may be a plurality of light beams. For convenience of explanation, however, it is assumed that each of the four groups of light beams is formed by one light beam.

Accordingly, in the following description, a group of light beams is simply referred to as a "light beam".

The four groups of light beams deflected by the polygon mirror 5 pass through a common (the same) first scanning lens 7, and then are reflected by respective sets of light path deflecting mirrors MA1 and MA2, MB1 and MB2, MC1 and MC2, and MD1 and MD2. Thereafter, each light beam passes through the corresponding one of second scanning lenses 8A, 8B, 8C and 8D, and is incident on the corresponding one of photoconductors 9A, 9B, 9C and 9D so as to form a beam spot on the surface of the photoconductor.

Then, each beam spot is displaced on the corresponding photoconductor in accordance with rotation of the polygon mirror 5 so that optical scanning (main scan) is performed.

FIG. 1B shows the optical arrangement of the light paths from the respective light sources to the scan surfaces in the embodiment shown in FIG. 1A in a developed manner.

Light beams emitted from a light source 1 are collimated to parallel light beams by a collimate lens 2. "Beam forming" is performed on the parallel light beams while passing through an aperture 3. Then, the light beams pass through a cylindrical lens 4, which serves as a line image forming optical system, and the light beams are focused only in the sub-scanning direction. The focused light beams are reflected by a virtual mirror 6 (hypothetically inserted in the light paths so that the drawing can be simply made, however, actually unnecessary). The reflected light beams form images at positions where the light beams are reflected (deflected) by the polygon mirror 5 as "images long in the main scanning direction" that are separated in the sub-scanning direction from each other.

Each of the light beams deflected by the rotation of the polygon mirror 5 passes through the common first scanning lens 7, and the light path of the light beam is bent by a light path deflecting mirror (not shown in FIG. 1B). The light beams are incident on the photoconductors 9A through 9D after passing through the second scanning lenses 8A through 8D.

As shown in FIG. 1C, the four light beams deflected by the polygon mirror 5 are substantially parallel to each other in the sub-scanning direction, and also close to each other. In this manner, the four light beams that are simultaneously deflected are close to each other in the sub-scanning direction. Accordingly, the "size in the direction of the rotation axis" of a reflection (deflection) surface of the polygon mirror 5 can be reduced, and thus the weight of the polygon mirror 5 can be reduced. Therefore, it is possible to rotate the polygon mirror 5 with low energy.

Various methods can be used to make the four light beams that are simultaneously deflected by the polygon mirror 5 "close and parallel to each other in the sub-scanning direction". However, there is a method as shown in FIG. 1D as an example.

That is, four light sources 1A, 1B, 1C and 1D are four semiconductor laser light sources of a semiconductor laser array. Four light beams emitted from the light sources 1A through 1D are collimated by the collimate lens 2 and focused in the sub-scanning direction by the cylindrical lens 4. Here, the collimate lens 2 and the cylindrical lens 4 should form an aforcal system in the sub-scanning direction (vertical direction in FIG. 1D), so that the main light beams of the light beams emitted from the cylindrical lens 4 (focused in the sub-scanning direction) are parallel to each other in the sub-scanning direction.

There are other methods such as using a combination prism, giving an opening angle between light beams in the main scanning direction when seen from the sub-scanning direction, and using a deflecting mirror as the method of guiding, from the light source side to the optical deflecting means, a plurality of light beams that are parallel to each other in the sub-scanning direction.

Referring to FIG. 1A, all of the four light beams that are simultaneously deflected by the polygon mirror 5 pass through the first scanning lens 7. The first scanning lens 7 satisfies a condition:

$$Pm > 0 \geq Ps \quad \text{(Condition (1))},$$

where Pm is a power of the first scanning lens 7 in the main scanning direction, and Ps is a power of the first scanning lens 7 in the sub-scanning direction. In addition, the second scanning lenses 8A through 8D, arranged nearer to the scan surfaces 9A through 9D, have positive power in the sub-scanning direction and transmit only one group of light beams directed to the corresponding scan surface.

In other words, the optical scanning device according to the embodiment shown in FIGS. 1A through 1D is an optical scanning device deflecting, by the common optical deflecting part 5, a plurality of groups of light beams emitted from the plurality of light sources 1A through 1D, and directing, by the scanning and imaging optical system, each of the groups of light beams to the corresponding one of the scan surfaces 9A through 9D so as to scan the plurality of scan surfaces 9A through 9D, wherein each of the groups of light beams deflected by the optical deflecting part 5 passes through at least two scanning lenses while being directed to the corresponding scan surface, and the first scanning lens 7 arranged nearest to the optical deflecting part 5 among the scanning lenses transmits the plurality of light beams directed to the respective (different) scan surfaces 9A through 9D, and satisfies the condition:

$$Pm > 0 \geq Ps \quad \text{(Condition (1))},$$

where Pm is the power in the main scanning direction, and Ps is the power in the sub-scanning direction, and the second scanning lenses 8A through 8D each arranged nearest to the corresponding scan surface possess positive power in the sub-scanning direction, and transmit only the respective groups of light beams directed to the corresponding scan surfaces.

A description will be given of the significance of the Condition (1) satisfied by the first scanning lens 7.

First, the significance of $Ps \leq 0$ is explained. In FIG. 2A, a reference numeral 5A designates a reflection (deflection) surface of the polygon mirror 5. FIG. 2A shows a state where a light beam is reflected, from a point of deflection, toward the scan surface side. A reference numeral 7 designates the principle surface of the first scanning lens in the sub-scanning direction. A reference numeral 8 designates the principle surface of an arbitrary one of the second scanning lenses 8A through 8D. A reference numeral 9 designates a scan surface (hereinafter referred to as a "scan surface").

As has been described with reference to FIGS. 1A through 1D, the light beams reflected by the reflection (deflection) surface 5A are parallel to each other in the sub-scanning direction and also close to each other. It is a great issue in such an optical system to separate the plurality of light beams that are close to each other in the sub-scanning direction into respective light paths to the corresponding scan surfaces.

In order to simplify such light beam separation, it is effective "to reduce the width of a light beam in the sub-scanning direction" and "to increase the interval in the sub-scanning direction between different light beams". Considering cases of Ps=0, Ps>0 and Ps<0, where Ps is the power of the first scanning lens 7 in the sub-scanning direction, in FIG. 2A, the solid line corresponds to the case of Ps=0, the broken line to the case of Ps<0, and the chain line to the case of Ps>0.

FIG. 2A shows that "it is possible to reduce the width of a light beam in the sub-scanning direction" by satisfying $Ps \leq 0$, compared with the case of Ps>0.

By the way, recently, there is demand for optical scanning devices corresponding to high densities and high quality images, and for smaller beam spots on scan surfaces. The spot diameter of a beam spot in the sub-scanning direction is determined by an angle θ (a convergence angle in the sub-scanning direction of a light beam directed to a scan surface) shown in FIG. 2A. The greater the convergence angle θ is, the smaller the spot diameter in the sub-scanning direction can be made. That is, the convergence angle θ for realizing the same spot diameter with respect to light beams having the same wavelength is constant.

Conventionally, in such a type of optical scanning device as shown in FIGS. 1A through 1D, the first scanning lens 7 generally has "positive power in the sub-scanning direction". However, as shown by the chain line in FIG. 2A, when the power Ps of the first type scanning lens 7 in the sub-scanning direction is positive, the width of a light beam becomes expanded in the sub-scanning direction between the first and second scanning lenses 7 and 8. Thus, it is difficult to perform the light beam separation.

When Ps=0, a light beam is not deflected in the sub-scanning direction by the first scanning lens 7. Thus, as shown by the solid line in FIG. 2A, it is possible to reduce the width of the light beam in the sub-scanning direction between the first and second scanning lenses 7 and 8. Accordingly, the light beam separation can be easily performed. When Ps<0, it is possible to further reduce the width of a light beam in the sub-scanning direction between the first and second scanning lenses 7 and 8, and thus the light beam separation can be more easily performed. Even when the power Ps is set to $Ps \leq 0$ as mentioned above, by setting the arrangement position and power in the sub-scanning direction of the second scanning lens 8 so as to give a required value to the convergence angle θ, it is possible to realize a beam spot having a smaller diameter in the sub-scanning direction.

Figure 2B:
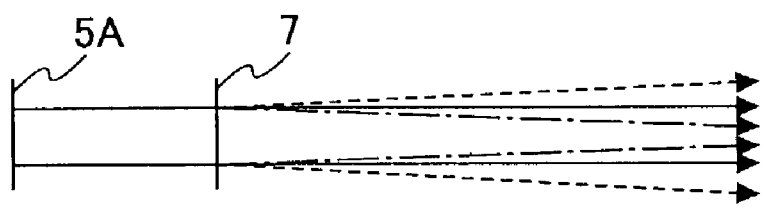

FIG. 2B shows the principle rays (parallel to each other in the sub-scanning direction) of two light beams reflected by the reflection (deflection) surface 5A of the polygon mirror 5 after passing through the first scanning lens 7. When the power Ps of the first scanning lens 7 in the sub-scanning direction is Ps=0, as shown by solid lines in FIG. 2B, the interval of the two light beams in the sub-scanning direction does not change even after passing through the first scanning lens 7.

When Ps<0, as shown by broken lines in FIG. 2B, the interval between the two light beams is enlarged in the sub-scanning direction after passing through the first scanning lens 7. Accordingly, when Ps≦0, the light beam separation can be easily performed. On the other hand, when Ps>0, as shown by chain lines in FIG. 2B, the interval between the two light beams after passing through the first scanning lens 7 is narrowed in the sub-scanning direction. Thus, it is difficult to perform the light beam separation.

When the power Pm in the main scanning direction and power Ps in the sub-scanning direction of the first scanning lens 7 arranged nearest to the optical deflecting part 5 satisfy the condition:

$$Pm > 0 \geq Ps \quad \text{(Condition (1))},$$

the scanning lens arranged nearest to a scan surface must have "positive power in the sub-scanning direction".

On the other hand, there is no problem in the light beam separation with respect to the main scanning direction. Thus, the power Pm in the main scanning direction of the scanning lens nearer to the optical deflecting part is set to Pm>0. In such a case, it is possible for the positive power Pm, which is provided to the scanning lens that is nearest to the optical deflecting part, to have "the major part of functions of correcting image forming characteristics in the main scanning direction (such as field curvature) and correcting constant velocity characteristics (such as f θ characteristics)" on the scan surface. Especially, when the positive power Pm has the major part of the functions of correcting the constant velocity characteristics, the deflection angle of the deflected light beam is small with respect the scanning lens nearer to the scan surface. Accordingly, it is possible to reduce the size in the main scanning direction of the scanning lens (the second scanning lens 8, in the above example) nearer to the scan surface.

The optical scanning device as described above with reference to FIGS. 1A through 1D, 2A and 2B also optically scans the plurality of scan surfaces 9A through 9D by deflecting the plurality of groups of light beams emitted from the plurality of light beams by the same optical deflecting part 5 and guiding, by the scanning and imaging optical system, the groups of light beams to the respective surfaces 9A through 9D to be scanned. The scanning and imaging optical system that guides the groups of light beams reflected by the optical deflecting part 5 to the respective scan surfaces includes the first type scanning lens 7 and the second type scanning lenses 8A through 8D.

The first type scanning lens 7 satisfies the condition:

$$Pm > 0 \geq Ps \quad \text{(Condition (1))}$$

where Pm is the power in the main scanning direction, and Ps is the power in the sub-scanning direction. The first type scanning lens 7 transmits a plurality of groups of light beams directed to respective scan surfaces.

The second type scanning lenses 8A through 8D possess positive power in the sub-scanning direction, and transmit the groups of light beams directed to the respective corresponding surfaces. Also, all scanning lenses arranged in the light paths to the scan surfaces from the optical deflecting part 5 are one of the first and second type scanning lenses.

As described above, it is possible for the positive power Pm, which is applied to the scanning lens (the first type) nearer to the optical deflecting part, to have the major part of functions of correcting image forming characteristics in the main scanning direction (such as field curvature) and correcting constant velocity characteristics (such as fθ characteristics) on the scan surface. A plurality of light beams directed to the respective scan surfaces pass through the scanning lenses. Thus, the function of correcting the constant velocity characteristics is standardized with respect to the light beams directed to the respective scan surfaces. Accordingly, it is possible to reduce "relative shift of optical scanning position in the main scanning direction on different scan surfaces (causing color shift (out of color registration) in the main scanning direction when forming a color image)" due to variation in processing the scanning lenses and temperature distribution. In addition, since a common (the same) lens is used for a plurality of light beams, it is also possible to reduce the number of lenses and the number of components for holding the lenses.

Additionally, the separation of light beams is facilitated by satisfying the condition Ps≦0. Thus, "the size in the axial direction" of reflection (deflection) surfaces of the optical deflecting part can be used. Accordingly, it is possible to realize a smaller, lower power consuming, more ruggedized, and quieter optical deflecting part. In addition, it is also possible to make the scanning lens nearer to the optical deflecting part smaller.

Further, it is possible to reduce scan line deflection by giving positive power in the sub-scanning direction to the "scanning lens nearer to the scan surface", through which scanning lens only the light beam directed to the corresponding scan surface passes.

Additionally, it is possible to completely separate the functions of the first type scanning lens (having positive power Pm in the main scan direction), through which scanning lens a plurality of light beams directed to different scan surfaces pass, and the functions of the second type scanning lens, through which only the light beam directed to the corresponding scan surface passes. Therefore, by taking advantage of the separation of the functions, it is possible to reduce difference in the constant velocity characteristics/scan line deflection among different scan surfaces. Accordingly, it is possible to realize an optical scanning device in which relative position shift in the main/sub-scanning directions of the optical scanning position on each scan surface is small.

Next, a description will be given of Condition (2).

As in the case of the optical scanning device as mentioned above, in a case of "an optical scanning device optically scanning a plurality of scan surfaces through deflecting, by the same optical deflecting part 5, a plurality of groups of light beams emitted from a plurality of light sources, and directing, by a scanning and imaging optical system, each of the groups of light beams to a different scan surface, generally, images written on the respective scan surfaces are positioned and superimposed, and formed in an image as a color image or a multi-color image.

It is well known that, in a case as mentioned above, when there is "relative position shift of the scanning position in the main/sub-scanning directions" among scan surfaces, a phenomenon called "color shift" arises in a formed image, and thus the image quality is degraded. Accordingly, it is important to reduce the "relative shift of the optical scanning position among different scan surfaces". When the value of a parameter of the Condition (2): $|(1/Rs1)+(1/Rs2)| \cdot L$ exceeds the upper limit 0.5, the following problems occur.

In the scanning lens nearer to the optical deflecting part, the power Ps in the sub-scanning direction satisfies Ps≦0 as mentioned above. However, when the absolute value of the power Ps becomes larger, the shape in the main scanning direction is different depending on "transmission position in the sub-scanning direction" of a plurality of light beams passing through the scanning lens. Therefore, in a case where "the major part of the functions of the constant velocity characteristics" is provided to the scanning lens, difference arises in the constant velocity characteristics depending on the light beam. Thus, the relative position shift in the main scanning direction of the scanning position among different scan surfaces becomes large.

In addition, when the absolute value of the power Ps in the sub-scanning direction of the scanning lens is large, difference arises in the bending characteristics of scan lines among light beams. Thus, the relative position shift of the optical scanning position in the sub-scanning direction on different scan surfaces is large.

By satisfying the Condition (2), it is possible to reduce the relative position shift of the optical scanning direction in the main/sub-scanning directions on different surfaces.

Next, a description will be given of the significance of Condition (3).

As described above, the scanning lens nearest to the optical deflecting part and the first type scanning lens "transmit a plurality of light beams directed to different scan surfaces". Thus, it is preferable that these scanning lenses include the functions to correct the constant velocity characteristics as much as possible. It is preferable that the scanning lens nearer to the scan surfaces, through which scanning lens only the light beam directed to the corresponding scan surface passes, and the second type scanning lens do not include "the functions of correcting the constant velocity characteristics".

When the parameter $|(1/Rm1)+(1/Rm2)|\cdot L$ of Condition (3) exceeds the upper limit 0.1, difference arises among the constant velocity characteristics of the different-scan surfaces, due to the difference in the shapes between the scanning lens nearest to the scan surface and the second type scanning lens caused by variation in the processing, and the difference in the shapes and refraction factors caused by the temperature difference between the lenses. Thus, the relative shift of the optical scanning position in the main scanning direction among the scan surfaces becomes large.

When Condition (3) is satisfied, even if there is a difference in shapes between the scanning lens nearest to the scan surface and the second type scanning lens caused by variation in the processing, and a difference in shapes and refraction factors caused by temperature difference between the lenses, since such differences have little influence on the constant velocity characteristics of the scanning lenses, it is possible to reduce the relative position shift of the optical scanning position in the main scanning direction among the scan surfaces.

As mentioned earlier, it is preferable that "the scanning lens arranged nearest to the optical deflecting part" and "the first type scanning lens" do not possess power in the sub-scanning direction. Additionally, it is preferable that "each of the scanning lenses arranged nearest to the corresponding scan surface" have substantially constant thickness in the optical axis in the effective area. Further, it is preferable that "conjugate lateral magnification β in the sub-scanning direction between the point of deflection of the optical deflecting part and the scan surfaces" satisfy a condition:

$|\beta|<1.2$ (Condition (4)).

When the scanning lens nearest to the optical deflecting part or the first type scanning lens does not possess power in the sub-scanning direction and Ps=0, "the relative scan position shift in the sub-scanning direction on different scan surfaces", which shift is due to the scanning lens, can be made 0. Further, it is possible to reduce bending in the scan lines.

When the scanning lenses arranged nearest to the respective scan surfaces or the second type scanning lenses possess "substantially constant thickness in the optical axis direction in the effective area", the scanning lenses do not possess the functions of correcting the constant velocity characteristics. Accordingly, even when there are differences in shapes of the scanning lenses caused by variation in the processing, or differences in shapes or refraction factors caused by temperature differences among the scanning lenses, it is possible to reduce a relative shift of "the scanning position in the main scanning direction" among different scan surfaces.

A description will be given of the significance of Condition (4).

Figure 2C:
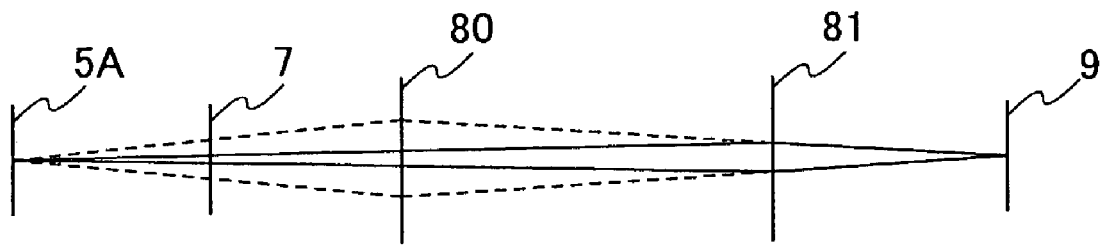

In FIG. 2C, the reference numeral 5A designates the reflection (deflection) surface, the reference numeral 7 designates the scanning lens nearer to the optical deflecting part, and the reference numeral 9 designates the scan surface. In addition, the reference numerals 80 and 81 designate two kinds of scanning lenses nearer to the scan surface. The conjugate lateral magnification β in the sub-scanning direction of the scanning lens 80 is large, and that of the scanning lens 81 is small.

As described above, the spot diameter in the sub-scanning direction is determined by the convergence angle θ in the sub-scanning direction of the light beams directed to the surface 9 to be scanned. The greater the convergence angle θ is, the smaller the diameter of the beam spot can be. The solid lines in FIG. 2C represent the light beam width in the sub-scanning direction when |β| is small. The broken lines represent the light beam width in the sub-scanning direction when |β| is large. In either case, the convergence angle θ is equal, and the equal spot diameter in the sub-scanning direction can be realized. However, the light beam width is wide when |β| is large, and the light beam width is narrow when |β| is small.

Particularly, when |β| is equal to or more than 1.2, the light beam width is very wide, and thus the light beam separation becomes difficult. In order to allow the light beam separation in such a case, there is no other choice but to increase the interval between light beams at the reflection (deflection) surface 5, inevitably giving rise to need for a larger optical deflecting part.

When |β|<1.2 is satisfied, the light beam separation is easy, and it is possible to realize a lower power consuming, more ruggedized, and more quiet optical deflecting part without giving rise to the need for a larger optical deflecting part. In addition, the scanning lens nearest to the optical deflecting part can be made smaller.

In the above-described embodiment, the plurality of groups of light beams deflected by the optical deflecting part are directed to the surfaces 9A through 9D to be scanned only by two types of lenses: the scanning lens 7 arranged nearer to the optical deflecting part, having positive power in the main scanning direction, and transmitting the plurality of groups of light beams directed to the different scan surfaces; and scanning lenses 8A through 8D arranged nearer to the scan surfaces, having positive power in the sub-scanning direction, and each passing the group of light beams directed to the corresponding scan surface.

In this case, the scanning lens 7 may "possess positive power only in the main scanning direction, and not possess power in the sub-scanning direction (Ps= 0)".

Hence, even when a plurality of scan surfaces are optically scanned, a lesser number of scanning lenses are required. For example, in a case where there are four different surfaces 9A through 9D to be scanned as in the embodiment shown in FIGS. 1A through 1D, only five scanning lenses (the scanning lenses 7 and 8A through 8D) are required in total. On the other hand, in a case where an independent image forming optical system is used for each of the scan surfaces, and each of the scan surfaces needs two lenses, eight lenses are required.

Additionally, when the scanning lens 7 nearer to the optical deflecting part is made so as "not to possess power in the sub-scanning direction", the relative scanning position shift in the sub-scanning direction among the scan surfaces, which shift is cause by the scanning lens 7, can be made 0, and thus the bending in scan lines can be made 0. Consequently, it is possible to reduce relative shifts of the scanning positions in the sub-scanning direction among the scan surfaces.

Further, when the deflected light beams pass through only two scanning lenses, the first and second type scanning lenses, it is possible to decrease the number of associated parts of the lenses with the reduction of the number of the lenses. At the same time, the flexibility of the layout is improved. Therefore, it is possible to realize a small optical scanning device.

As mentioned above, it is preferable that among the plurality of light beams deflected by the optical deflecting part, at least two groups of light beams "are substantially parallel in the sub-scanning direction". In this way, it is possible to reduce the relative difference in the scan lines on the scan surfaces.

The optical scanning device as described above is provided with the "plurality of light beams" and the scan surfaces for the same number of the light sources. Thus, each of the light sources emits one group of light beams, and this one group of light beams (the "group of light beams") optically scans the scan surface corresponding to the light source.

Accordingly, the plurality of light sources emit the "plurality of groups of light beams" on the whole, and the plurality of groups of light beams are deflected by the same (common) optical deflecting part.

Various kinds of conventionally known mirrors, such as a rotary polygon mirror, a rotary single-surface mirror and a rotary two-surface mirror such as a pyramidal mirror and a tenon-shaped mirror, and a galvanometer mirror may be used as the "optical deflecting part".

A "plurality of polygon mirrors that are concentrically integrated and integrally rotated" may be used as the "common optical deflecting part".

In the optical scanning device as described above, the plurality of groups of light beams optically scan the respective scan surfaces. However, the "respective surfaces" also include, for example, "a case where areas to be optically scanned vary greatly" on a common photoconductor such as a drum and a belt. That is, in such a case, though the scan surfaces are different from one another, the photoconductor forming these scan surfaces is the same.

In the embodiment shown in FIGS. 1A through 1D, the scanning and imaging optical system for each of the scan surfaces includes the scanning lens 7 and one of the scanning lenses 8A through 8D. Each image forming optical system may be used as a scanning and imaging optical system used for "an optical scanning device deflecting, by an optical deflecting part, a single group of light beams emitted from a light source and directing, by a scanning and imaging optical system, the single group of light beams to a scan surface so as to perform optical scanning".

That is, the scanning and imaging optical system used for the above-described optical scanning device includes two scanning lenses, the scanning lens nearer to the optical deflecting part is a lens having power only in the sub-scanning direction, and the scanning lens nearer to the scan surface satisfies a condition:

$$|(1/Rm1)+(1/Rm2)|\cdot L<0.1 \qquad \text{(Condition (3))},$$

where $Rm1$ is the radius of curvature in the main scanning direction of the entrance surface of the scanning lens nearer to the optical deflecting part, $Rm2$ is the radius of curvature in the main scanning direction of the emitting surface, and $L$ is the optical path length from the point-of deflection of the optical deflecting part.

When the scanning lens close to the scan surface satisfies Condition (3), it is possible for the scanning lens close to the optical deflecting part to include the major part of the functions of correcting the constant velocity characteristics. Since the power in the sub-scanning direction of the scanning lens nearer to the optical deflecting part is 0, even when the light beams incident on the scanning lens close to the optical deflecting part are shifted in the sub-scanning direction, there is no shape variation in a main scanning cross section (a hypothetical cross section parallel to the optical axis in the main scanning direction), no degradation of the constant velocity characteristics, and no degradation in the image forming performance in the main scanning direction.

In addition, even when there is a local defect such as a contaminant in the scanning lens close to the optical deflecting part, since there is no optical axis in the sub-scanning direction, it is possible to arrange the scanning lens by selecting the best sub-scanning position.

Also in this case, by making the scanning lens that is arranged nearest to the scan surface "have substantially constant thickness in the optical axis direction in the effective area", even when the light beams incident on the scanning lens nearer to the optical deflecting part are shifted in the sub-scanning direction, there is no shape variation in the main scanning cross section, no degradation in the constant velocity characteristics, and no degradation in the image forming characteristics in the main scanning direction.

Figure 3:
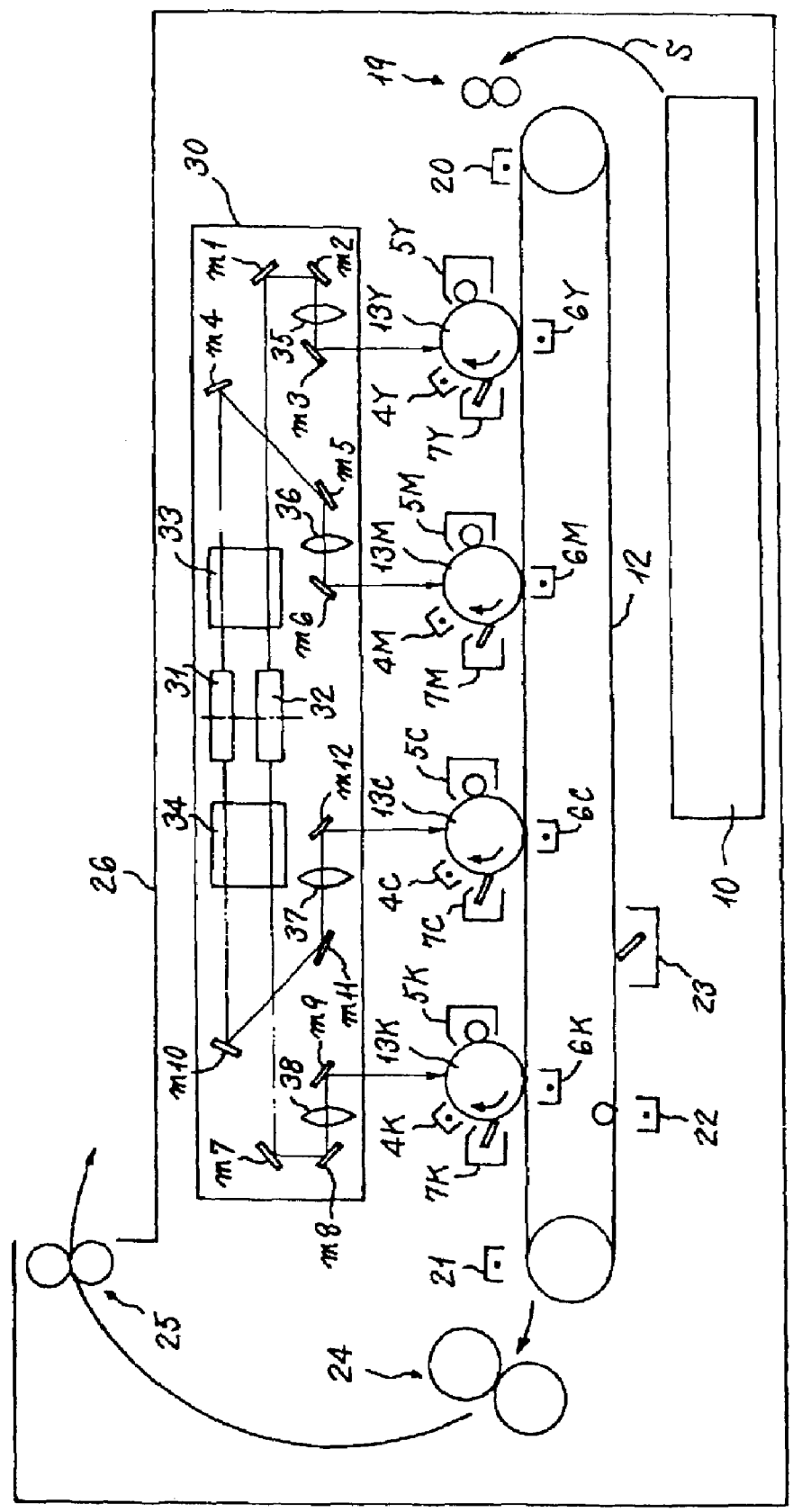
FIG. 3 is a block diagram for explaining another embodiment of the image forming apparatus.

FIG. 3 shows a second embodiment of the image forming apparatus.

A paper feed cassette 10 is arranged at the bottom inside the apparatus. A carrying belt 12 is provided over the paper feed cassette 10. The carrying belt 12 carries a transfer paper S, which is a sheet recording medium fed from the paper feed cassette 10. Four photosensitive media 13Y, 13M, 13C and 13K are arranged over the carrying belt 12 and along the circumferential surface of the carrying belt 12 as shown in FIG. 3.

In the following description, Y, M, C and K represent yellow, magenta, cyan and black, respectively. The photosensitive media 13Y, 13M, 13C and 13K are all photoconductors, and hereinafter referred to as "photoconductors 13Y through 13K".

The photoconductors 13Y through 13K have the same diameter. Processing parts according to an image forming process are arranged in order around each of the photoconductors 13Y through 13K. Taking the photoconductor 13Y as an-example, a charging part 4Y as charging means, a developing unit 5Y, a transfer charger 6Y, a cleaning unit 7Y and the like are arranged.

The photoconductors 13Y through 13K are arranged at regular intervals from the upstream to the downstream of the carrying path of the transfer paper (transfer paper carrying path) S, that is, from the right side to the left side of FIG. 3. Around the carrying belt 12, a resist roller 19 and a charger 20 are provided on the upstream side of the photoconductor 13Y. A separating part 21 as separating means, a discharging part 22 as discharging means and a belt cleaner 23 are provided on the downstream side of the photoconductor 13K. A fixing unit 24 is provided on the downstream side of the separating part 21. A delivering roller 25 is provided at the end of the transfer paper carrying path. The delivering roller 25 is constructed such that the transfer paper is delivered onto a tray 26, which also serves as a top board of the image forming apparatus.

An optical scanning device 30 is provided above the arrangement of the photoconductors 13Y through 13K.

The reference numerals 31 and 32 designate polygon mirrors of an optical deflecting part. The reference numerals 33, 34, 35, 36, 37 and 38 designate lenses. The reference numerals m1 through m12 designate mirrors for bending light paths.

Although not shown in FIG. 3, four light sources are provided, and four groups of light beams are emitted from the four light sources. Each of the groups of light beams includes one or a plurality of light beams depending on whether the single beam scanning method is used or the multi-beam scanning method is used.

In other words, the "group of light beams" refers to the total number of light beams used to scan a scan surface. When the scan surface is optically scanned by the single beam scanning method, the "group of light beams" in this case is "a single light beam". On the other hand, when the scan surface is optically scanned by the multi-beam scanning method, a plurality of light beams that simultaneously perform multi-beam scanning on the scan surface form the "group of light beams".

Accordingly, it is possible to use the "single beam scanning method" and the "multi-beam scanning-method" for optically scanning the scan surfaces in the optical scanning device according to the present invention.

Among the four groups of light beams, two groups of light beams are incident on the polygon mirror 31. The two-groups of light beams are deflected and separated into the left side and right side of FIG. 3 by the polygon mirror 31. Optical scanning is performed on the photoconductors 13M and 13C by the respective separated groups of light beams. The other two groups of light beams are incident on the polygon mirror 32. These two groups of light beams are deflected and separated into the left side and right side of FIG. 3. The optical scanning is performed on photoconductors 13Y and 13K by the respective separated groups of light beams.

The two groups of light beams deflected in the right side area of FIG. 3 by the polygon mirrors 31 and 32 pass through the scanning lens 33, which is commonly used by these light beams. Then, the light beam separation is performed on the light beams by the mirrors m1 through m6. The light beams are directed to the photoconductors 13M and 13Y on which the optical scanning is to be performed. The light beams directed to the photoconductors 13M and 13Y pass through the scanning lenses 36 and 35, and form beam spots on the photoconductors 13M and 13Y, respectively, so as to perform the optical scanning.

The other two groups of light beams deflected in the left side area of FIG. 3 by the polygon mirrors 31 and 32 pass through the scanning lens 34, which is commonly used by these light beams. Then, the light beam separation is performed on the light beams by the mirrors m7 through m12. The light beams are directed to the photoconductors 13C and 13K on which the optical scanning is to be performed. The light beams directed to the photoconductors 13C and 13K pass through the scanning lenses 37 and 38, and form beam spots on the photoconductors 13C and 13K, respectively, so as to perform the optical scanning.

That is, the above-mentioned optical scanning device is the optical scanning device that deflects, by the common optical deflecting parts 31 and 32, the plurality of groups of light beams emitted from the plurality of light sources, and directs, by the scanning and imaging optical systems, the groups of deflected light beams to the respective different scan surfaces so as to optically scan the plurality of scan surfaces, wherein each of the groups of light beams deflected by the optical deflecting parts 31 and 32 passes through at least two scanning lenses while being directed to the corresponding scan surface, the scanning lens 33, which is arranged nearest to the optical deflecting parts 31 and 32 among the scanning lenses, transmits the plurality of groups of light beams directed to the different scan surfaces 13Y and 13M, the scanning lens 34, which is also arranged nearest to the optical deflecting parts 33 and 34, transmits the plurality of groups of light beams directed to the different scan surfaces 13C and 13K.

The scanning lenses 33 and 34 satisfy the condition: $Pm > 0 \geq Ps$, where Pm is the power in the main scanning direction thereof and Ps is the power in the sub-scanning direction thereof. The scanning lenses 35 through 38, which are arranged nearest to the respective scan surfaces, have positive power in the sub-scanning direction and transmit only the groups of light beams directed to the respective corresponding scan surfaces.

In addition, the scanning lenses 33 and 34 are the first type scanning lenses, and the scanning lenses 35 through 38 are the second type scanning lenses.

When performing the full color mode (mode using a plurality of colors), for example, with the construction as described above, an image forming process including the optical scanning is carried out for each of the photoconductors 13Y through 13K. Taking the image forming process for the photoconductor 13Y as an example, the light beam (deflected by the polygon mirror 32) that is to optically scan the photoconductor 13Y is modulated with yellow image information.

The photoconductor 13Y is uniformly charged by the charging part 4Y while rotating clockwise at a constant speed. The optical scanning is performed on the photoconductor 13Y by the above-described light beam, thereby a "yellow image" is written thereon, and an electrostatic latent image (negative image) corresponding to the yellow image is formed. The electrostatic latent image is developed by the developing unit 5Y and made visible as a "yellow toner image". In this way, the yellow toner image is formed on the photoconductor 13Y.

Similarly, a magenta toner image, a cyan toner image and a black toner image are formed on the photoconductors 13M, 13C and 13K, respectively. The transfer paper S, to which toner images of respective colors are to be transferred, is fed from the paper feed cassette 10 and placed on the carrying belt 12 by the resist roller 19 at the appropriate time On this occasion, the charger 20 discharges toward the transfer paper S so that the transfer paper S is electrostatically stuck to the carrying belt 12.

The transfer paper S, which is stuck to the carrying belt 12, is carried according to the counterclockwise rotation of the carrying belt 12 so that, to the transfer paper S, the yellow toner image is transferred from the photoconductor 13Y by the transfer charger 6Y, a magenta toner image is transferred from the photoconductor 13M by the transfer charger 6M, a cyan toner image is transferred from the photoconductor 13C by a transfer charger 6C, and a black toner image is transferred from the photoconductor 13K by a transfer charger 6K. A color image is formed such that the toner images of respective colors are superimposed on each other on the transfer paper S.

Then, when the separating part 21 discharges the transfer paper S, the transfer paper S is separated (detaches) from the carrying belt 12 by its own elasticity. The transfer paper S is delivered on the tray 26 by the delivering roller 25 after the color image is fixed to the transfer paper S by the fixing unit 24.

The carrying belt 12 after the separation of the transfer paper S is discharged by the discharging part 22. The belt cleaner 23 clears toner and paper dust away from the carrying belt 12.

A description will be given of specific embodiments relating to the scanning and imaging optical system.

Through all the embodiments, a semiconductor laser having an emission wavelength of 780 nm is assumed as the light source. Also, the conditions from the light source to the optical deflecting part are the same. That is, light beams emitted from the light source are coupled by a coupling lens to be "weakly focused light beams" of which distance from the deflection surface to the natural converging point is 1200 nm. The light beams may be parallel light beams or diverging light beams depending on the design.

The light beams that pass through the coupling lens pass through an aperture for setting the diameter of the light beams on the scan surface to a desired value. Thereafter, by the cylindrical lens having power only in the sub-scanning direction, the light beams are formed into a line image that is long in the main scanning direction in the vicinity of the reflection (deflection) surface of the polygon mirror of the optical deflecting part.

The light beams reflected by the optical deflecting part are directed to the scan surface via the first and second type scanning lenses that are forming the scanning and imaging optical system. The optical path length from the point of deflection by the optical deflecting part to the scan surface is 175 mm for all the embodiments. The opening of the aperture has a rectangular shape. The dimensions of the opening are 3.6 mm in the main scanning direction and 0.22 mm in the sub-scanning direction.

Lens data of lenses from the cylindrical lens onward are shown below. Rm and Rs are radii of curvature in the main scanning direction and the sub-scanning direction, respectively. D is the interval between surfaces. N is the refraction factor of the wavelength (780 nm) used. The specific construction of the optical scanning device may be those shown in FIGS. 1A through 1D and 3, for example. It should be noted that the unit used for expressing the quantities having lengths is mm.

| Embodiment 1 | | | | | |
|---|---|---|---|---|---|
| Surface No. | Rm | Rs | D | N | Note |
| 1 | ∞ | 13.88 | 3 | 1.5244 | cylindrical lens |
| 2 | ∞ | ∞ | 25 | 1 | |
| 3 | ∞ | ∞ | 33.3 | 1 | reflection surface |
| 4(*) | 160.4 | ∞ | 13.5 | 1.5244 | 1st type scanning lens |
| 5(*) | −141.3 | ∞ | 84.2 | 1 | |
| 6(**) | −700 | −70 | 3 | 1.5112 | 2nd type scanning lens |
| 7(***) | −700 | −15.6 | 41 | 1 | |
| 8 | — | — | — | — | scan surface |

The surfaces (No. 4 and No. 5) with (*) appended to their surface numbers are formed in aspheric shapes in the main scanning direction, and have no power in the sub-scanning direction over the entire effective areas. The aspheric shapes are expressed by a known equation (1):

$$X = Y^2 / \{Rm + Rm \cdot \sqrt{1 - (1+K)Y^2/Rm^2}\} + A_4 Y^4 + A_6 Y^6 + A_8 Y^8 + A_{10} Y^{10} \quad \text{equation (1)}$$

TABLE 1

| | No. 4 | No. 5 |
|---|---|---|
| K | −60 | 4.693 |
| $A^4$ | −9.465E − 07 | −1.015E − 06 |
| $A^6$ | 3.847E − 10 | 2.438E − 10 |
| $A^8$ | −8.113E − 14 | −7.856E − 14 |
| $A^{10}$ | 1.000E − 17 | 2.797E − 17 |

In the above table 1, the exponential expression "E−14" denotes "$10^{-14}$", for example, and the numeric value preceding such exponential expression is multiplied by the exponential expression.

The surface (No. 6) with (**) appended to its surface number is formed in an arc shape in the main scanning direction, and the radius of curvature of the sub-scanning cross sections (hypothetical parallel cross sections orthogonal to the main scanning direction) is constant over the entire effective area.

The surface (No. 7) with (***) appended to its surface number is formed in an arc shape in the main scanning direction, and the radius of curvature of the sub-scanning cross section can be expressed by the following equation (2). In this surface, the radius of curvature Rs(Y) of the sub-scanning cross section varies according to the height Y of the lens (lens height) in the main scanning direction, as expressed by the equation (2). The field curvature in the sub-scanning direction is substantially corrected by the shape.

$$Rs(Y) = Rs + a_2 Y^2 + a_4 Y^4 + a_6 Y^6$$

(Rs: radius of curvature when Y=0)

$$a_2 = -6.3E-04, a_4 = a_6 = 0 \quad \text{equation (2)}$$

Figure 4A:
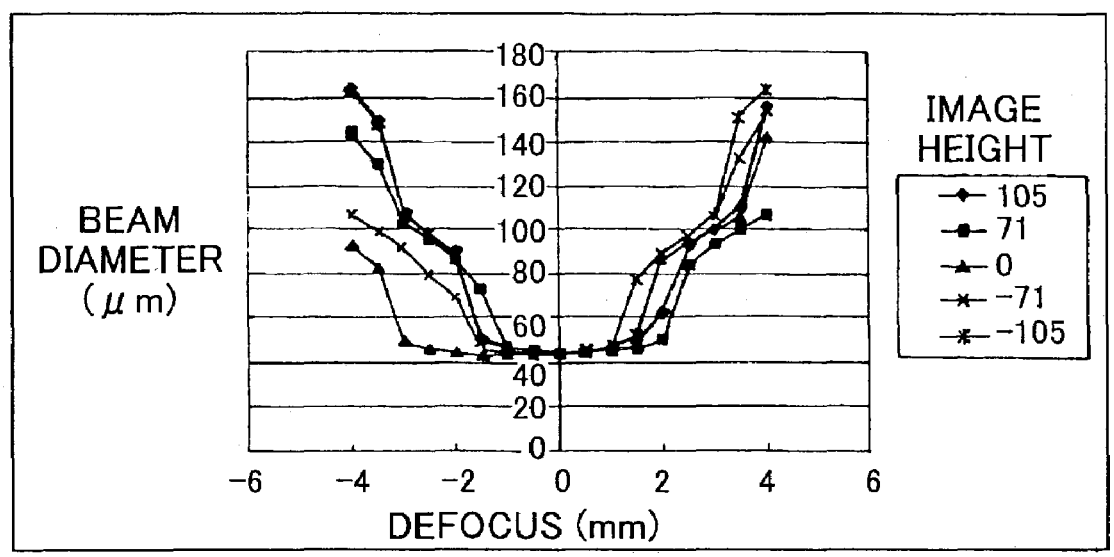
FIGS. 4A and 4B are graphs showing variation of a beam diameter with respect to defocusing relating to Embodiment 1 in the main scanning direction and the sub-scanning direction, respectively.
Figure 4B:
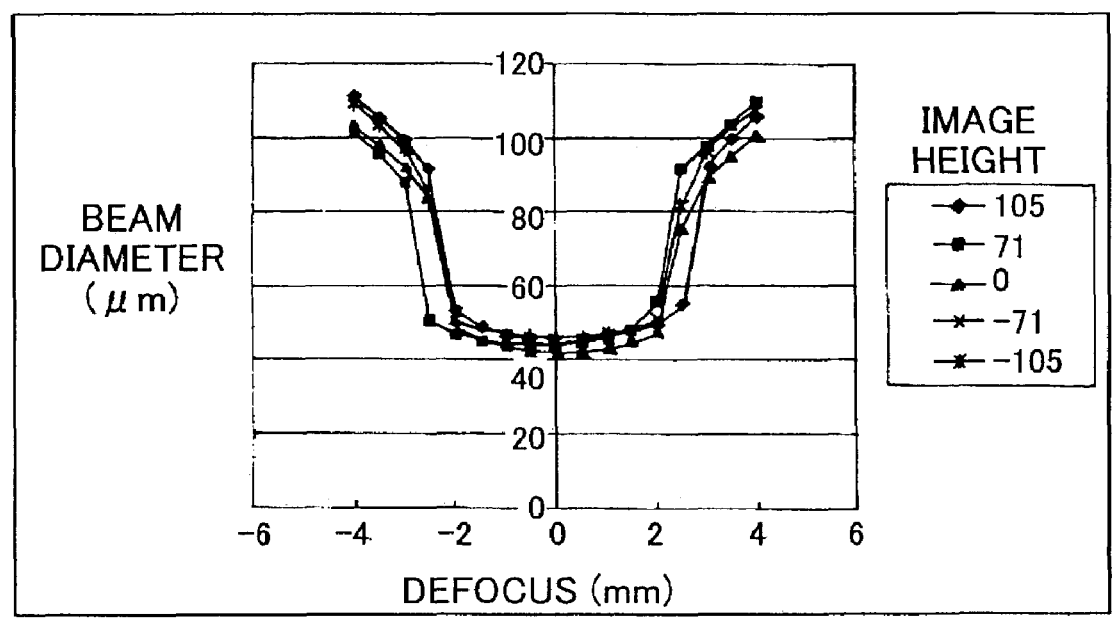

FIGS. 4A and 4B show variation of beam diameter with respect to defocusing in the main scanning direction and the sub-scanning direction, respectively. FIGS. 4A and 4B show beam diameter characteristics having a large focal depth with a small diameter (a little more than 40 μm in both sub-scanning direction and main scanning direction).

Figure 5A:
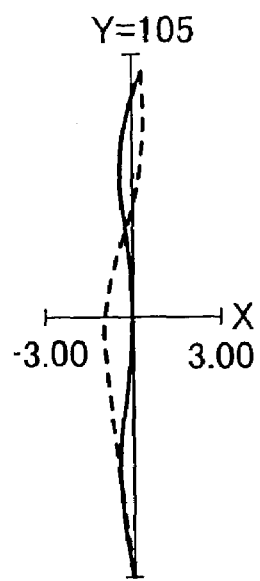
FIGS. 5A, 5B and 5C are aberration diagrams relating to Embodiment 1.
Figure 5B:
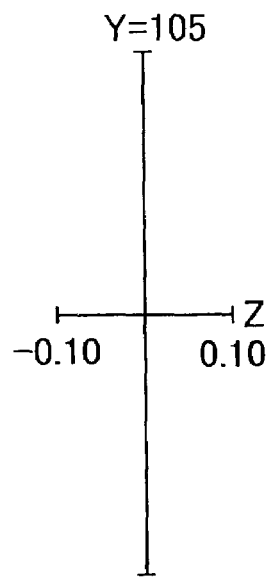
Figure 5C:
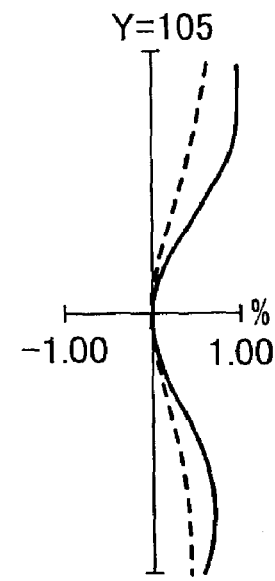

FIGS. 5A through 5C are aberration diagrams. FIG. 5A shows the characteristics of the field curvature. In FIG. 5A, the broken line represents the characteristics in the main scanning direction, and the solid line represents that in the sub-scanning direction. FIG. 5B shows "the characteristics of scan line deflection". In addition, FIG. 5C shows the constant velocity characteristics. In FIG. 5C, the solid line represents linearity (error of magnification when the evaluation length is infinitely small), and the broken line is the value of (shift amount from ideal image height/ideal image height)×100%. The following aberration diagrams follow these examples. It should be noted that, in the aberration diagrams of each embodiment, the vertical axis represents the image height in mm, and the unit of the horizontal axis in the diagrams, showing the characteristics of field curvature and scan line deflection, is mm.

As is clear from FIGS. 5A through 5C, each aberration is well corrected. Additionally, the power Ps in the sub-scanning direction of the first type scanning lens, which is arranged nearer to the optical deflecting part, is 0. Thus, the aberrations are not influenced by the distance of incidence of a light beam in the sub-scanning direction. Therefore, when constructing an optical scanning device such as that shown in FIGS. 1A through 1D by using the image forming lens according to Embodiment 1, the aberrations of the different scan surfaces are exactly the same. Accordingly, it is possible to substantially reduce the relative shifts in the main/sub-scanning directions among the scan surfaces.

Embodiment 2

| Surface No. | Rm | Rs | D | N | Note |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | reflection surface |
| 4(*) | 160.4 | −100 | 13.5 | 1.5244 | 1st type scanning lens |
| 5(*) | −141.3 | −135 | 84.2 | 1 | |
| 6(**) | −700 | −70 | 3 | 1.5112 | 2nd type scanning lens |
| 7(***) | −700 | −15.6 | 41 | 1 | |
| 8 | — | — | — | — | scan surface |

In Embodiment 2, both sides of the first type scanning lens are "convex to the reflection (deflection) surface side" in the sub-scanning cross section, and have weak power (Ps<0) in the sub-scanning direction.

The shapes of the surfaces (No. 4 and No. 5), with (*) appended to their surface numbers, in the main scanning direction are expressed by the above-described equation (1) and obtained as shown in Table 2.

TABLE 2

| | No. 4 | No. 5 |
|---|---|---|
| K | −60 | 4.693 |
| $A^4$ | −9.465E − 07 | −1.015E − 06 |
| $A^6$ | 3.847E − 10 | 2.438E − 10 |
| $A^8$ | −8.113E − 14 | −7.856E − 14 |
| $A^{10}$ | 1.000E − 17 | 2.797E − 17 |

The shapes of those in the sub-scanning direction are expressed by the above-described equation (2) and obtained as shown in Table 3.

TABLE 3

| | No. 4 | No. 5 |
|---|---|---|
| $A^2$ | −6E − 02 | 0 |
| $A^4$ | 0 | 0 |
| $A^6$ | 0 | 0 |

That is, the radius of curvature in the sub-scanning direction of only the surface No. 4 is varied according to the lens height Y in the main scanning direction. Hence, even when the positions in the sub-scanning direction of light beams that pass through the first type scanning lens are different depending on the surfaces to optically scan, it is possible to substantially correct the scan line deflection so as to reduce relative shifts of the scanning positions in the sub-scanning direction.

The surface (No. 6) with (**) appended to its surface number is formed in an arc shape in the main scanning direction, and the radius of curvature of the sub-scanning cross section is constant over the entire effective area.

The surface (No. 7) with (***) appended to its surface number is formed in an arc shape in the main scanning direction, and the radius of curvature of the sub-scanning cross section can be expressed by the equation (2). In the surface (No. 7), the radius of curvature of the sub-scanning cross section varies arbitrarily in accordance with the lens height Y in the main scan direction. Hence, the field curvature in the sub-scanning direction can be substantially corrected.

$a_2 = -6.3E-04$, $a_4 = a_6 = 0$

Figure 6A:
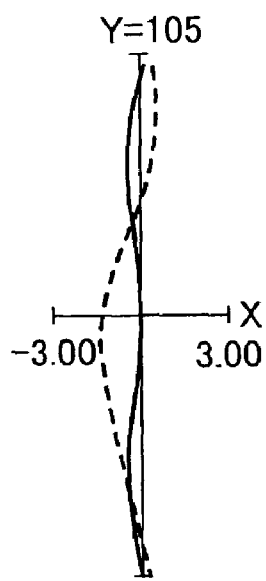
FIGS. 6A, 6B and 6C are aberration diagrams relating to Embodiment 2.
Figure 6B:
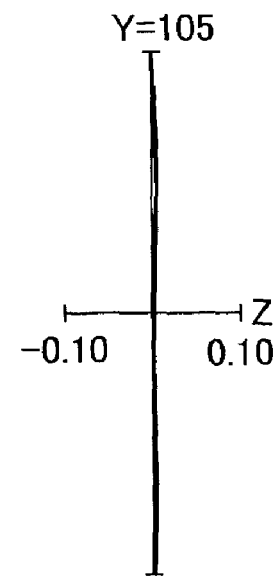
Figure 6C:
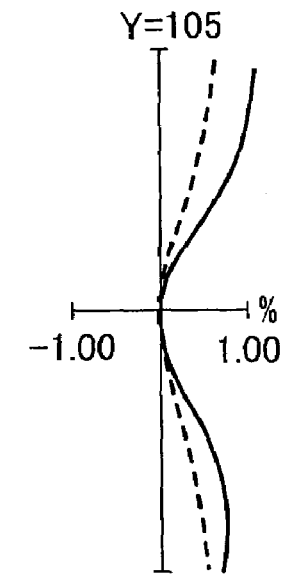
Figure 7A:
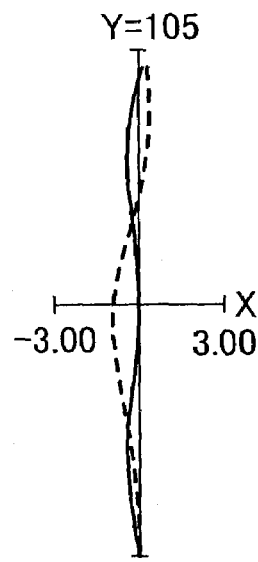
FIGS. 7A, 7B and 7C are aberration diagrams relating to Embodiment 2.
Figure 7B:
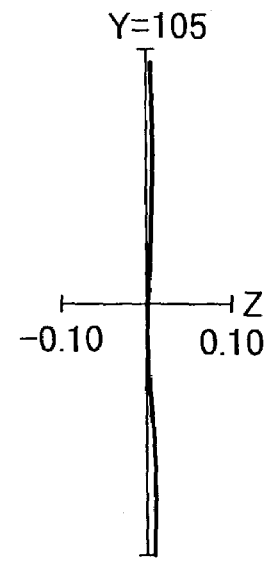
Figure 7C:
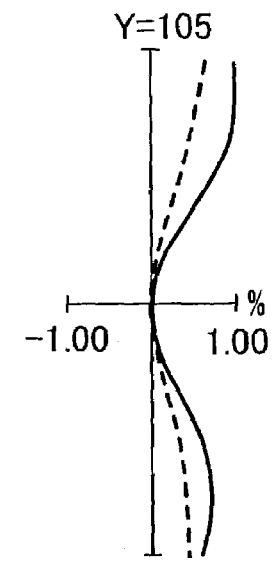

Aberration diagrams of the scanning and imaging optical system according to Embodiment 2 are shown in FIGS. 6A through 6C and 7A through 7C on the pattern of FIG. 5A through 5C. FIGS. 6A through 6C are the aberration diagrams relating to "light beams passing through the positions distant from the optical axis for ±3 mm in the sub-scanning direction". FIGS. 7A through 7C are the aberration diagrams relating to "light beams passing through the positions distant from the optical axis for ±1 mm in the sub-scanning direction". FIGS. 6A through 7C show that the field curvature in the main/sub-scanning directions are substantially corrected at each passing position, and especially, the scan line deflection are substantially corrected. In addition, the difference in the constant velocity characteristics among light beams is small.

Accordingly, when an optical scanning device similar to that shown in FIGS. 1A through 1D is constructed by using the scanning and imaging optical system according to Embodiment 2, it is possible to optically scan the photoconductors 9A through 9D practically equally and substantially correctly. Additionally, since the first type scanning lens has negative power in the sub-scanning direction, it is easy to perform light beam separation between the first and second type scanning lenses.

Embodiment 3

| Surface No. | Rm | Rs | D | N | Note |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | reflection surface |
| 4(*) | 160.4 | −80 | 13.5 | 1.5244 | 1st type scanning lens |
| 5(*) | −141.3 | −135 | 84.2 | 1 | |
| 6(**) | −700 | −70 | 3 | 1.5112 | 2nd type scanning lens |
| 7(***) | −700 | −15.6 | 41 | 1 | |
| 8 | — | — | — | — | scan surface |

The difference between Embodiment 2 and Embodiment 3 is only the radius of curvature of an entering surface of the first type scanning lens. The other data including a coefficient of an aspheric surface are the same as those of Embodiment 2.

Figure 8A:
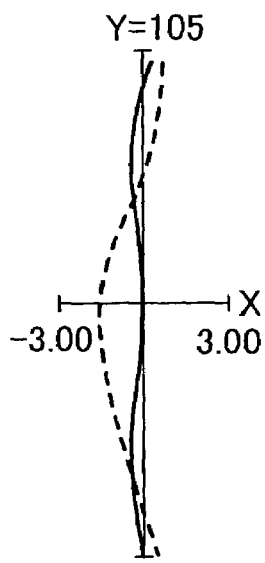
FIGS. 8A, 8B and 8C are aberration diagrams relating to Embodiment 3.
Figure 8B:
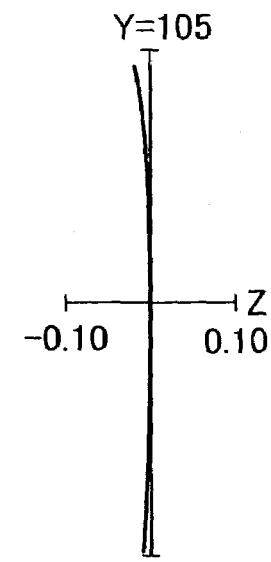
Figure 8C:
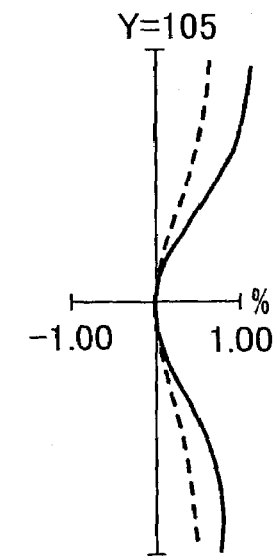

Aberration diagrams relating to Embodiment 3 are shown in FIGS. 8A through 8C and 9A through 9C on the pattern of FIGS. 5A through 5C. FIGS. 8A through 8C are the aberration diagrams relating to "light beams passing through the positions distant from the optical axis for ±3 mm in the sub-scanning direction". FIGS. 9A through 9C are the aberration diagrams relating to "light beams passing through the positions distant from the optical axis for ±1 mm in the sub-scanning direction".

Referring to FIGS. 8A through 9C, all of the field curvature, scan line deflection, and constant velocity characteristics are substantially corrected. The differences in the above values between the two passing positions of light beams, however, are greater compared with Embodiment 2. This is because the negative power Ps in the sub-scanning direction of the first type scanning lens is made stronger than that of Embodiment 2.

Embodiment 4

| Surface No. | Rm | Rs | D | N | Note |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | reflection surface |
| 4(*) | 160.4 | ∞ | 13.5 | 1.5244 | 1st type scanning lens |
| 5(*) | −141.3 | ∞ | 84.2 | 1 | |
| 6(**) | −700 | −70 | 3 | 1.5112 | 2nd type scanning lens |
| 7(***) | −600 | −15.6 | 41 | 1 | |
| 8 | — | — | — | — | scan surface |

The difference between Embodiment 4 and Embodiment 1 is only the radius of curvature in the main scan direction of the exiting surface of the second type scanning lens. The other data including a coefficient of an aspheric surface are the same as those of Embodiment 1.

FIGS. 10A through 10C show aberration diagrams on the pattern of FIGS. 5A through 5C.

As is clear from FIGS. 10A through 10C, each aberration is substantially corrected. The power Ps in the sub-scanning direction of the first type scanning lens, which is arranged nearer to the optical deflecting part, is 0. Thus, the aberrations are not influenced by the distances of incidence of light beams in the sub-scanning direction. Therefore, when constructing an optical scanning device similar to that shown in FIGS. 1A through 1D by using the image forming lens according to Embodiment 4, the aberrations of the different scan surfaces are exactly the same. Accordingly, it is possible to substantially-reduce the relative shifts of scan positions in the main/sub-scanning directions among the scan surfaces.

Embodiment 5

| Surface No. | Rm | Rs | D | N | Note |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | reflection surface |
| 4(*) | 160.4 | ∞ | 13.5 | 1.5244 | 1st type scanning lens |
| 5(*) | −141.3 | ∞ | 84.2 | 1 | |
| 6(**) | −700 | −70 | 3 | 1.5112 | 2nd type scanning lens |
| 7(***) | −520 | −15.6 | 41 | 1 | |
| 8 | — | — | — | — | scan surface |

The difference between Embodiment 5 and Embodiment 1 is only the radius of curvature in the main scan direction of the entering surface of the second type scanning lens. The other data including a coefficient of an aspheric surface are the same as those of Embodiment 1.

Figure 11A:
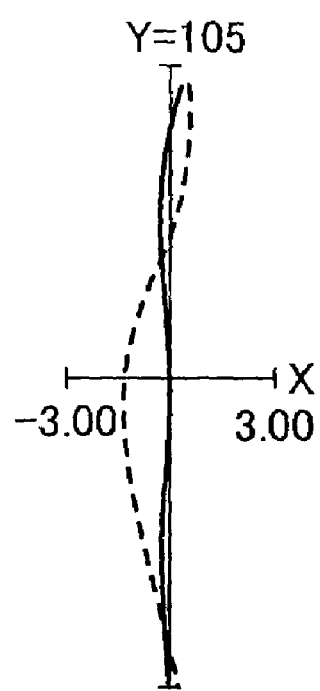
FIGS. 11A, 11B and 11C are aberration diagrams relating to Embodiment 5.
Figure 11B:
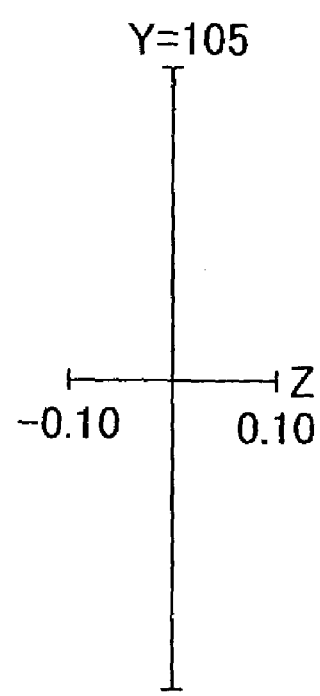
Figure 11C:
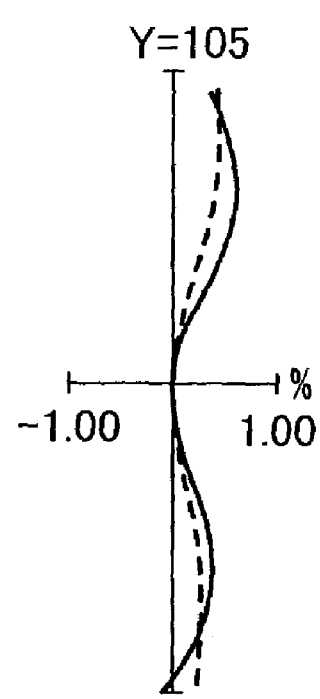

FIGS. 11A through 11C show aberration diagrams on the pattern of FIGS. 5A through 5C.

As is clear from FIGS. 11A through 11C, each aberration is substantially corrected. The power Ps in the sub-scanning direction of the first type scanning lens, which is arranged nearer to the optical deflecting part, is 0. Thus, the aberrations are not influenced by the distances of incidence of light beams in the sub-scanning direction. Therefore, when constructing an optical scanning device such as that shown in FIGS. 1A through 1D by using the image forming lens according to Embodiment 5, the aberrations of the different scan surfaces are exactly the same. Accordingly, it is possible to substantially reduce the relative shifts of scan positions in the main/sub-scanning directions among the scan surfaces.

The relationships between Embodiments 1 through 5 and Conditions (Conds.) (1) through (4) are as follows.

| | Embodiment 1 | Embodiment 2 | Embodiment 3 | Embodiment 4 | Embodiment 5 |
|---|---|---|---|---|---|
| Cond. (1) | applicable | applicable | applicable | applicable | applicable |
| Cond. (2) | applicable | applicable | inapplicable | applicable | applicable |
| Left side value of | 0 | 0.45 | 0.89 | 0 | 0 |

-continued

|  | Embodiment 1 | Embodiment 2 | Embodiment 3 | Embodiment 4 | Embodiment 5 |
| --- | --- | --- | --- | --- | --- |
| Cond. (2) Cond. (3) | applicable | applicable | applicable | applicable | applicable |
| Left side value of Cond. (3) | 0 | 0 | 0 | 0.04 | 0.09 |
| Cond. (4) | applicable | applicable | applicable | applicable | applicable |
| $|\beta|$ | 0.316 | 0.311 | 0.3 | 0.316 | 0.316 |

The scanning and imaging optical systems according to Embodiments 1, 4 and 5 can be preferably used as the scanning and imaging optical system of "an optical scanning device performing optical scanning through deflecting, by an optical deflecting part, a single group of light beams emitted from a light source, and directing, by a scanning and imaging optical system, the group of deflected light beams to a scan surface".

Further, in the above-described Condition (1), the upper limit of Pm is determined by the individual (case-by-case) characteristics in the main scanning direction required for the scanning and imaging optical system. In addition, the lower limit of Ps is determined by how much the scan line deflection can be corrected.

In each of Embodiments 1 through 5, the entering surface of the scanning lens that is nearest to the optical deflecting part has a convex shape toward the optical deflecting part. The scanning lens that is nearest to the scan surface is "curved in the main scanning direction".

In the image forming apparatus according to the present invention, various kinds of "photoconductive media" may be used. For example, a "silver film" may be used as the photoconductive medium. In this case, a latent image is formed by optically scanning the silver film. The latent image can be made visible by a normal developing process of silver photography. Such an image forming apparatus may be embodied as an "optical platemaking apparatus" and an "optical drawing apparatus" drawing such as CT scanned images.

A "coloring medium that is colored by heat energy of a beam spot while being optical scanned" may also be used as the photoconductive medium.

Further, a "photoconductor" may also be used as the photoconductive medium. A sheet material such as zinc oxide paper and "drum-shaped or belt-shaped material that is repeatedly used" such as a selenium photoconductor and an organic semiconductor may be used as the photoconductors.

When using a photoconductor as the photoconductive medium, an electrostatic latent image is formed by uniform charging of the photoconductor and optical scanning using the optical scanning device. The electrostatic latent image is made visible as a toner image through developing. The toner image is directly fixed onto the photoconductive medium in a case where the photoconductive medium is formed in a sheet such as zinc oxide paper. On the other hand, in a case where the photoconductive medium is a material that can be repeatedly used, the toner image is transferred/fixed onto a sheet recording medium such as transfer paper and an OHP sheet (a plastic sheet for overhead projectors).

When transferring the toner image from the photoconductor to the sheet recording medium, the toner image may be directly transferred from the photoconductor to the sheet recording medium (direct transfer method), or transferred from the photoconductor to an intermediate transfer medium such as an intermediate transfer belt, and thereafter transferred to the sheet recording medium from the intermediate transfer medium (intermediate transfer method).

Such an image forming apparatus may be embodied as an optical printer (laser printer), optical plotter (laser plotter), and digital copying apparatus.

In a case of the image forming apparatus using the optical scanning device according to the present invention that optically scans the plurality of scan surfaces by the light beams from the plurality of light sources, "three or four photoconductors" forming the scan surfaces, which are to be optically scanned by the light beams from the respective light sources, may be arranged in parallel with one another so that the image forming apparatus may be embodied as a well-known "tandem-type color image forming apparatus".

An "imaging mirror" may be used as the imaging element that is "arranged nearest to the corresponding scan surface" in the scanning and imaging optical system of the optical scanning device. However, when an imaging mirror is used, a "separating part separating incident light beams and reflected light beams" is required, resulting in severe restrictions for the optical system layout and occurrence of scan line deflection. Additionally, when the imaging mirror does not possess power in the main scanning direction, there are problems such as difficulty in reducing the lateral magnification ratio in the sub-scanning direction and the like. Therefore, it is preferable that a scanning lens be used.

Further, in the optical scanning device according to the present invention, it is preferable that the entering surface of the scanning lens arranged nearest to the optical deflecting part be formed into a "convex shape toward the optical deflecting part" with a view of avoiding ghost light. In the optical scanning device of the present invention, when the entering surface of the scanning lens arranged nearest to the optical deflecting part is formed in a "concave shape toward the optical deflecting part", there is a possibility that a part of deflected light beams will reach the scan surfaces as ghost light. That is, a part of deflected light beams are reflected by the entering surface and returned to the optical deflecting part, then further reflected by the reflection (deflection) surface of the optical deflecting part and made incident again to the scanning lens, and reach the scan surfaces as ghost light.

Since the scanning lens does not possess positive power in the sub-scanning direction, the entering surface thereof tends to be a surface without curvature or a concave shape. Thus, components reflected by the entering surface tend to return to the optical deflecting part. Such tendency becomes noticeable when the plurality of groups of deflected light beams are incident on the scanning lens, and thus ghost light tends to appear.

The light beams reflected by the entering surface travel in a "direction departing from the optical deflecting part" by forming the entering surface of the scanning lens arranged nearest to the optical deflecting part into the "convex shape toward the optical deflecting part". Thus, it is possible to effectively reduce the influence of the light beams reflected by the entering surface and having an influence as ghost light on the scan surfaces.

In addition, by forming the entering surface into the "convex shape toward the optical deflecting part", the positive power of the scanning lens can be effectively allocated to the entering surface and exiting surface. Accordingly, the correction of aberration is facilitated.

It is preferable that the exiting surface of the scanning lens arranged nearest to the scan surface be "curved in the main scanning direction". Curving the exiting surface in the main scanning direction as such facilitates the correction of scan line deflection. That is, it is possible to effectively correct scan line deflection by adjusting the scanning lens through rotating the scanning lens around an "axis parallel in the main scanning direction".

Additionally, the scanning lens nearest to the optical deflecting part possesses a small power in the sub-scanning direction. Thus, the lateral magnification ratio in the sub-scanning direction according to the image height is determined by the "scanning lens nearest to the scan surface". The lateral magnification in the sub-scanning direction here is a "lateral magnification in the sub-scanning direction between the reflection (deflection) surface and the scan surface".

By curving the exiting surface (the lens surface on the scan surface side) of the scanning lens nearest to the scan surface in the main scanning direction, it is possible to reduce the lateral magnification ratio in the sub-scanning direction according to the image height, variation among image heights of the beam diameter (the diameter of a beam spot) in the sub-scanning direction, and variation among image heights of a scan line pitch in a case of the multi-beam scanning.

In each of the embodiments, the ratio of the lateral magnification in the sub-scanning direction among image heights is assumed to be equal to or less than 9%. However, it is possible to further reduce the lateral magnification ratio among image heights by "optimizing the curving shape in the sub-scanning direction" of the scanning lens nearest to the scan surface.

Figure 12:
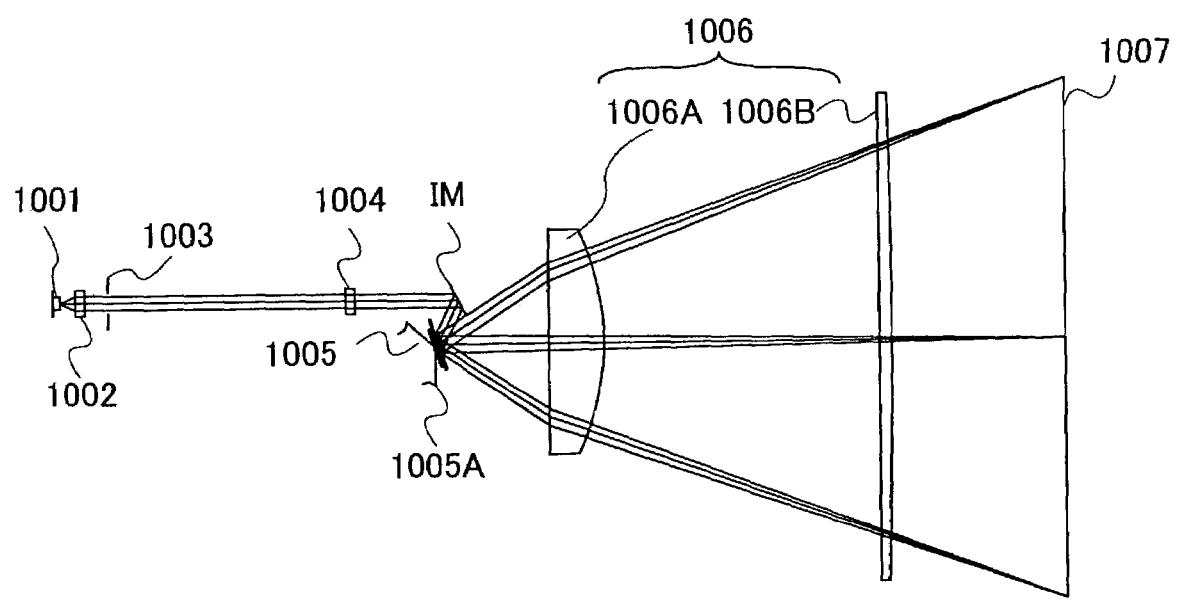
FIG. 12 is a schematic diagram showing an optical arrangement in one embodiment of the optical scanning device.

FIG. 12 shows an optical arrangement of an optical scanning device according to one embodiment of the present invention. It should be noted that a scanning and imaging lens 1006 is formed by two or more scanning lenses, scanning lenses 1006A and 1006B, for example.

The optical scanning device is an optical scanning device including a deflecting part 1005 (as deflecting means) deflecting light beams from a light source 1001, and the scanning and imaging lens 1006 directing, to a scan surface 1007, the light beams deflected by the deflecting part 1005 and focusing, as a beam spot, the light beams on the scan surface 1007, wherein the scanning and imaging lens 1006 includes two or more lenses, the scanning lenses 1006A and 1006B, the scanning lens 1006A nearest to the deflecting part 1005 among the two or more scanning lenses 1006A and 1006B possesses a positive refracting power in the main scanning direction and substantially zero refracting power in the sub-scanning direction, and the scanning lens 1006B nearest to the scan surface 1007 among the two or more scanning lenses possesses a negative power in the main scanning direction and a positive power in the sub-scanning direction.

The light beams emitted from the light source 1001 are converged into parallel beams (may possess a weak converging property or a weak diverging property) by a coupling lens 1002, and coupled by an optical system, which performs a process on the parallel beams thereafter. The coupled light beams are subjected to beam forming by passing through the opening of an aperture 1003 so as to obtain a desired spot diameter on the scan surface 1007. Then, the light beams are converged in the sub-scanning direction by a cylindrical lens 1004, formed into a "line image that is long in the main scanning direction" in the vicinity of a reflection (deflection) surface 1005A of the deflecting part 1005 via a mirror IM, and deflected by the deflecting part 1005 in a constant angular velocity manner. The deflecting part 1005 is a rotary polygon mirror.

The light beams deflected by the deflecting part 1005 are focused onto the scan surface 1007 as a beam spot by the scanning lenses 1006A and 1006B, which form the scanning and imaging lens 1006, so as to optically scan the scan surface 1007 at a constant velocity.

In the optical scanning device, the two scanning lenses 1006A and 1006B that form the scanning and imaging lens 1006 are both plastic lenses. The scanning lens 1006A nearer to the deflecting part 1005 is made to possess a "positive refracting power in the main scanning direction" and the positive refracting power is set such that "constant velocity characteristics (fθ characteristics) are substantially corrected". The scanning lens 1006B nearer to the scan surface 1007 is made to possess a "negative refracting power in the main scanning direction".

In this way, by making the refracting power of the scanning lens 1006A positive, and the refracting power of the scanning lens 1006B negative with respect to the main scanning direction, environmental variation such as temperature change and variation in the optical characteristics of each of the scanning lenses 1006A and 1006B due to variation of emission wavelength in the light source 1001 are balanced out. Hence, the degradation of the optical characteristics of the scanning and imaging lens 1006 due to environmental variation and wavelength variation is reduced.

As shown in FIG. 12, the scanning lens 1006B nearer to the scan surface 1007 is formed into a "long shape". When forming the scanning lens 1006B as a "lens having a positive refracting power in the main scanning direction", the wall thickness of the peripheral parts of the lens becomes thin with respect to the wall thickness of the lens in the central part of the longitudinal direction thereof. Thus, since there is a difference-in the wall thickness between the central part in the longitudinal direction and the peripheral parts, deformation of the lens shape by such as a "sink mark" tends to occur during a forming process.

However, since the scanning lens 1006B possesses a refraction factor that is "negative in the main scanning direction", a "great difference in wall thickness" is not generated in the longitudinal direction. Thus, the forming process is easy.

As described above, the scanning lens 1006A includes the functions of correcting the constant velocity characteristics. Since the scanning lens 1006A does not possess refracting power in the sub-scanning direction, the constant velocity characteristics as the scanning and imaging lens 1006 are not degraded even when a position of incidence of the deflected light beam is shifted in the sub-scanning direction. Additionally, it is possible to control degradation of the imaging characteristics in the main scanning direction.

With respect to the sub-scanning direction, the refracting power of the scanning lens 1006A is substantially 0. Thus, the scanning lens 1006B possesses strong positive refracting power. Accordingly, with respect to the sub-scanning direction, the scanning lens 1006B possesses functions of "focusing the deflected light beams on the scan surface". In this way, the imaging functions in the sub-scanning direction are taken on by the scanning lens 1006B nearer to the scan surface 1007. Thus, the scanning and imaging lens 1006 serves as a "reducing system" with respect to the sub-scanning direction. Hence, the imaging position of the beam spot and the spot diameter are less subject to mounting errors of optical components, shape error and the like. Of course, the scanning and imaging lens 1006 serves to form a "geometrical-optical conjugate relationship between the point of deflection of the deflecting part 1005 and the scan surface 1007" with respect to the sub-scanning direction. Consequently, the scanning and imaging lens 1006 includes "optical face tangle error correcting functions" at the deflecting part 1005.

The "shape of the surface in the main scanning direction" of the scanning lens 1006A nearer to the deflecting part 1005 may be aspheric shape. In addition, by forming the surface shape of the scanning lens 1006B nearer to the scan surface 1007 into a "surface that is aspheric shape in the main scanning direction, and in which surface a curvature radius in the sub-scanning cross section is varied in the main scanning direction so that a line of center of curvature formed by lining centers of radius in the sub-scanning cross sections becomes a curved line that is different from the aspheric shape in the main scanning direction in the main scanning cross section", it is possible to substantially correct field curvature in both main scanning and sub-scanning directions.

In this way, it is possible to realize stability of the beam spot by substantially correcting the field curvature in the main scanning and sub-scanning directions, while maintaining the "constant velocity functions (functions of achieving constant velocity)".

Figure 13A:
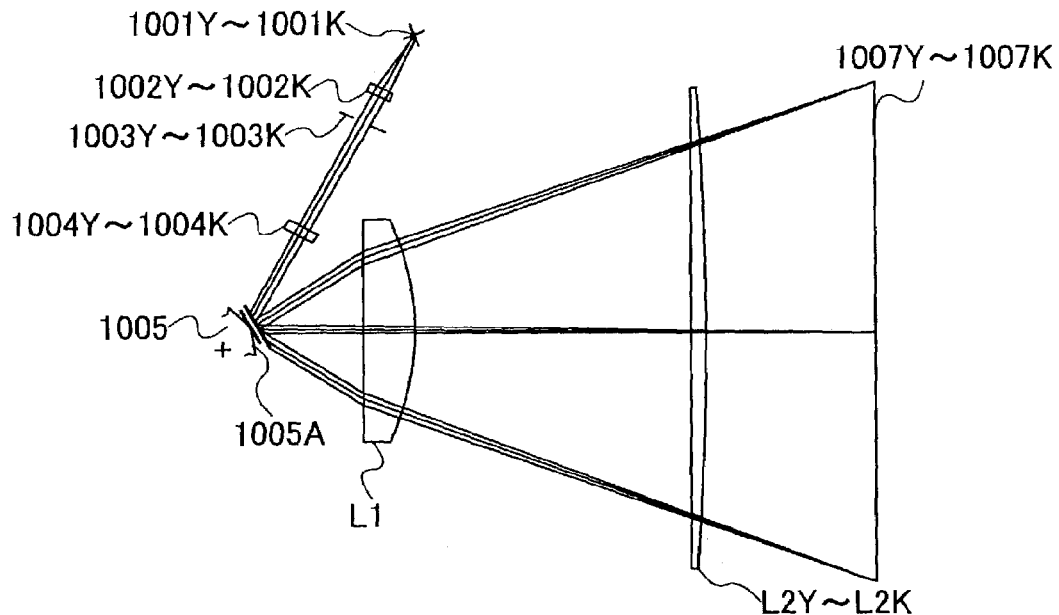
FIGS. 13A, 13B and 13C are schematic diagrams for explaining the optical scanning part of a tandem-type image forming apparatus using the optical scanning device.
Figure 13B:
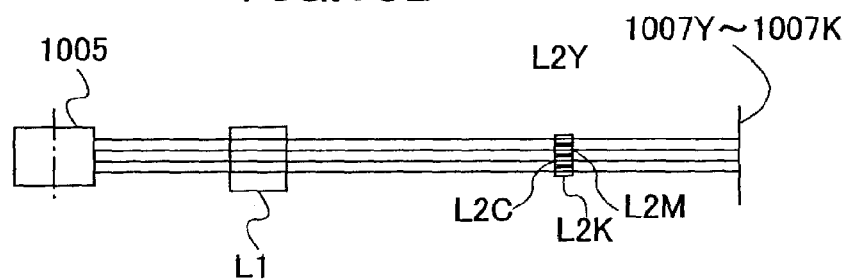
Figure 13C:
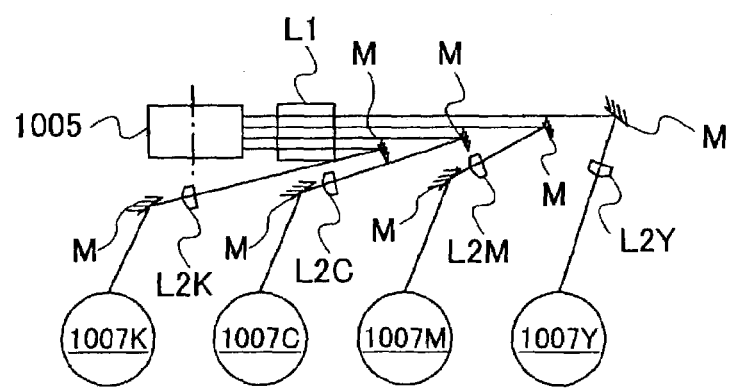

FIGS. 13A, 13B and 13C are schematic diagrams for explaining one embodiment of an optical scanning device of a "tandem-type image forming apparatus". This image forming apparatus is an apparatus that forms a color image.

FIG. 13A is a schematic diagram showing an optical arrangement seen from the sub-scanning direction. In order to simplify the diagram, from the deflecting part 1005 to the scan surface side, the light paths of the deflected light beams are shown in a state where the light paths are developed on a plane.

A color image is formed by including "toner images of four colors", yellow, magenta, cyan and black. Regarding reference numerals used in the following description, "Y" relates to yellow, "M" to magenta, "C" to cyan, and "K" to black.

As shown in FIG. 13A, in the part from light sources to the deflecting part (rotary polygon mirror) 1005, four light sources 1001Y through 1001K, four coupling lenses 1002Y through 1002K, four apertures 1003Y through 1003K, and four cylindrical lenses 1004Y through 1004K are arranged. That is, the light source 1001Y is overlapped with the other three light sources 1001M, 1001C and 1001K when seen from the sub-scanning direction (in a direction orthogonal to FIG. 13A). The coupling lens 1002Y is overlapped with the other three coupling lenses 1002M, 1002C and 1002K when seen from the sub-scanning direction. The aperture 1003Y is overlapped with the other three apertures 1002M, 1002C and 1002K when seen from the sub-scanning direction. The cylindrical lens 1004Y is overlapped with the other three cylindrical lenses 1004M, 1004C and 1004K when seen from the sub-scanning direction.

The light sources 1001Y through 1001K are such as semiconductor lasers. The light beams emitted from the light sources 1001Y 1001M, 1001C and 1001K are coupled by the coupling lenses 1002Y, 1002M, 1002C and 1002K so as to be converged into a light beam form suitable for the following optical system, for example, parallel light beams. Then, the light beams are subjected to beam forming by the apertures 1003Y, 1003M, 1003C and 1003K. Thereafter, the light beams are formed into "line images that are long in the main scanning direction" in the vicinity of the reflection (deflection) surface 1005A of the deflecting part 1005, and are simultaneously deflected by the common deflecting part 1005.

The (principal rays of) four light beams that are emitted from the respective light sources and incident on the deflecting part 1005 are parallel to each other in the sub-scanning direction.

FIG. 13B shows a state where the light paths from the deflecting part 1005 to the scan surfaces 1007Y through 1007K are developed linearly. The scan surfaces 1007Y through 1007K are "photoconductors". As shown in FIG. 13C, each of the scan surfaces 1007Y through 1007K are formed into a cylindrical shape and arranged so as to be parallel to each other. In FIG. 13B, the scan surfaces 1007Y through 1007K are drawn such that the scan surfaces 1007Y through 1007K are in the same plane.

As shown in FIG. 13B, the light beams from the light sources 1001Y through 1001K are reflected (deflected) in a direction that is orthogonal to the rotation axis of the reflection (deflection) surface by the common deflecting part 1005 such that the light beams are parallel to each other. The deflected light beams pass through the scanning lens L1. The scanning lens L1 is used in common by the four light beams.

The light beams that pass through the scanning lens L1 are focused on the respective (different) scan surfaces 1007Y through 1007K by the scanning lenses L2Y through L2K. Hence, a beam spot is formed on each of the scan surfaces 1007Y through 1007K, thereby the scan surface is optically scanned.

The scanning lenses L1 and L2Y form a "scanning and imaging lens that forms the beam spot on the scan surface 1007Y. The scanning lenses L1 and L2M form a "scanning and imaging lens that forms the beam spot on the scan surface 1007M. The scanning lenses L1 and L2C form a "scanning and imaging lens that forms the beam spot on the scan surface 1007C. The scanning lenses L1 and L2K form a "scanning and imaging lens that forms the beam spot on the scan surface 1007K. The scanning lenses L2Y through L2K are the same scanning lens.

As shown in FIG. 13C, the light paths of the imaging light beam from the scanning and imaging lenses are appropriately bent by light path deflecting mirrors M and directed to the corresponding photoconductors 1007Y through 1007K.

The beam spots formed on the respective photoconductors 1007Y through 1007K optically scan the photoconductors 1007Y through 1007K, respectively, so as to write an electrostatic latent image thereon.

In this embodiment, the lenses forming the scanning and imaging lenses are all plastic lenses. Of course, the scanning lens L1, which is nearest to the deflecting part 1005, is also a plastic lens.

Additionally, the optical scanning device shown in FIGS. 13A through 13C includes the plurality of light sources 1001Y through 1001K. The light beams from the respective light sources 1001Y through 1001K are deflected by the common deflecting part 1005, directed to the respective scan surfaces 1007Y through 1007K by the scanning lenses L1 and L2Y through L2K, focused on the corresponding scan surfaces 1007Y through 1007K as the beam spots, and among two or more scan lenses forming the scanning and imaging lens, the scanning lens L1 nearer to the deflecting part 1005 is used in common by the plurality of light beams directed to the respective scan surfaces 1007Y through 1007K.

Since the scanning lens L1 nearer to the deflecting part 1005 does not possess refracting power in the sub-scanning direction, as shown in FIG. 13B, the plurality of light beams directed to the respective scan surfaces 1007Y through 1007K pass through the scanning lens L1 substantially parallel with each other in the sub-scanning direction (up and down direction of FIG. 13B). As described above, (the principle rays of) the light beams that pass through the scanning lens L1 are parallel to each other and do not get close to each other. Thus, it is easy to arrange the light path dividing mirrors M.

The scan surfaces that are optically scanned by the optical scanning device are photosurfaces of "photosensitive media" such as photoconductors. However, in addition to the photosurfaces of the different photosensitive media, the "respective scan surfaces" include "different optical scanning positions to which different images are written" on the same photosensitive medium.

Further, in addition to the photoconductor, a silver film may be used as the photosensitive medium. A latent image formed by optically scanning the silver film can be made visible by a normal developing process of silver photography.

Such an image forming apparatus using silver film as the photosensitive medium can be embodied as an optical platemaking apparatus and an optical drawing apparatus (forming a CT scanned image).

In the embodiment shown in FIGS. 13A through 13C, among the lenses forming the scanning and imaging lenses, the scan lens L1 nearer to the deflecting part 1005 is used in common by the plurality of (=4) light beams directed to the scan surfaces 1007Y through 1007K. The deflecting part 1005 is a rotary polygon mirror. Heat generation by a motor part and a circuit board of the deflecting part 1005 is intense, and the temperature within the optical box (optical housing) is increased by the heat generation of the motor part. According to the temperature change, temperature distribution is created on the scanning lens L1 nearest to the deflecting part 1005, and thus the optical characteristics thereof are varied.

Since the scanning lens L1 includes functions of correcting the scanning characteristics (constant velocity functions), the constant velocity characteristics are varied according to the above-described variation of the optical characteristics. However, even when such variation of the constant velocity characteristics comes out, since the scanning lens L1 is used in common by the plurality of light beams that optically scan the respective photoconductors 1007Y through 1007K the variation of the constant velocity characteristics are shared in common by the photoconductors 1007Y through 1007K. Accordingly, "differences in the constant velocity characteristics" do not result among the photoconductors 1007Y through 1007K. Hence, even when environmental variation occurs while printing continuously and thus the constant velocity characteristics of the scanning and imaging lens varied, it is possible to control generation of hue variation and color shift of a color image "due to the variation of the constant velocity characteristics".

In the embodiment shown in FIGS. 13A through 13C, the parts from the light sources 1001Y through 1001K to the cylindrical lenses 4Y through 4K are "arranged in parallel with each other and in a superimposing manner in the sub-scanning direction" with respect to yellow, magenta, cyan and black. However, in the layout of the optical scanning device, the plurality of light sources 1001Y through 1001K, the coupling lenses 1002Y through 1002K and the like may be arranged to be distant in the main scanning direction, and the light beams may be appropriately bent using such as deflecting mirrors.

Further, the light beams that are deflected by the deflecting part 1005 and optically scan the four photoconductors 1007Y through 1007K are incident on the scanning lens L1 in parallel in the sub-scanning direction. However, another construction may be applied. For example, a scan lens corresponding to the scanning lens L1 may be arranged on both sides of a deflecting part, two of the four light beams may be reflected in the opposite direction of the other two of the four light beams with respect to a common deflecting part, and the two groups of the two beams, which are divided into both sides of the deflecting part, may pass through the respective common scanning lenses.

So far the description has been given of the embodiment of a case where a plurality of scan surfaces are optically scanned by the single beam scanning method. As described above, the optical scanning of the scan surfaces may be performed by the multi-beam scanning method. That is, there are a case where a plurality of light beams optically scan respective (different) scan surfaces, and also a case where a plurality of light beams-optically scan one scan surface as in the multi-beam scanning method. A description will now be given of one embodiment of such a case, by referring to FIGS. 14A, 14B and 14C.

Figure 14A:
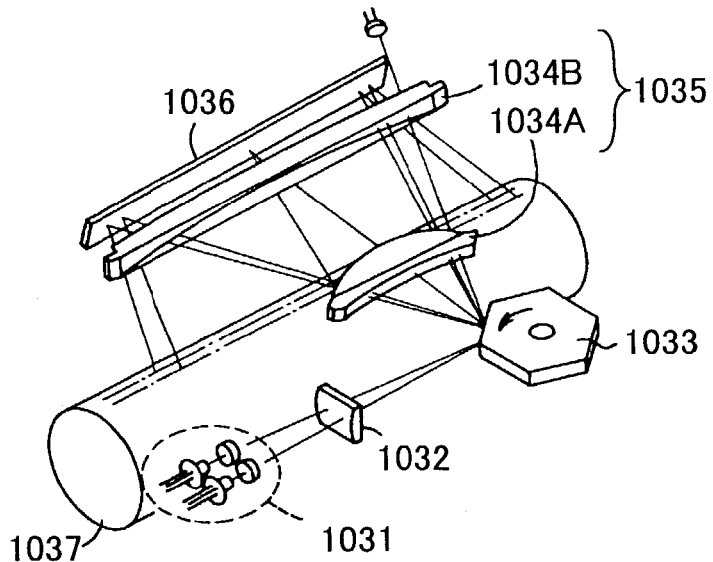
FIGS. 14A, 14B and 14C are schematic diagrams for explaining one embodiment of the optical scanning device of a multi-beam scanning method using the optical scanning device.

In FIG. 14A, a light source device designated by reference numeral 1031 includes two semiconductor lasers and two coupling lenses coupling the light beams emitted from the semiconductor lasers. The two light beams emitted from the respective semiconductor lasers and coupled by the corresponding coupling lenses are formed into "line images that are separated in the sub-scanning direction and long in the main scanning direction" on the same reflection (deflection) surface of a deflecting part 1033 by a cylindrical lens 1032. In this situation, the two light beams from the respective semiconductor lasers cross in the main scanning direction at one point in the vicinity of the reflection (deflection) surface.

The light beams deflected by the deflecting part 1033 pass through scanning lenses 1034A and 1034B that form a scanning and imaging lens 1035. Then, the light paths of the light beams are bent by a light path deflecting mirror 1036 and focused on a photoconductor 1037, which forms a scan surface. Thereby, two beam spots separated in the sub-scanning direction are formed thereon, and the scan surface is optically scanned by the multi-beam scanning method.

That is, in this embodiment, the optical scanning device includes a plurality of light sources, the deflecting part 1033 is a reflective type having reflection (deflection) surfaces, and all light beams that are deflected by the same reflection (deflection) surface and optically scan the same scan surface 1037 cross in the main scanning direction at one point in the vicinity of the deflection surface.

"All light beams that are deflected by the same reflection (deflection) surface cross in the main scanning direction at one point in the vicinity of the reflection (deflection) surface" refers to that when a plurality of light beams that are incident on the same reflection (deflection) surface are seen from the sub-scanning direction, these light beams cross at one point in the vicinity of the reflection (deflection) surface.

Figure 14B:
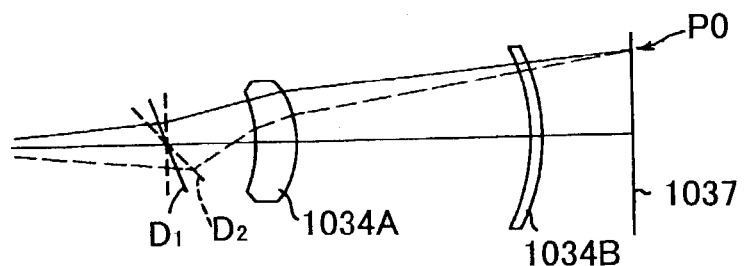

FIG. 14B shows a case where light beams are incident on the reflection (deflection) surface at different positions. Suppose the positions of the reflection (deflection) surface when two light beams (the principle rays are represented by a solid line and a broken line) reach the same position P0 on the scan surface 1037 are indicated by $D_1$ and $D_2$ with respect to the light beams represented by the solid line and the broken line, respectively. Then, in the case shown in FIG. 14B, the light paths to the imaging position P0 via the scanning lenses 1034A and 1034B are significantly different between the two light beams. Also, the optical actions are different when there is a difference between the light paths. Therefore, the spot diameter of the beam spot formed at the imaging position P0, the imaging magnification and the like tend to be different between the light beams represented by the solid line and the broken line. Especially, scan line deflection is prone to occur since the impact on variation of the scan line pitch is significant.

Figure 14C:
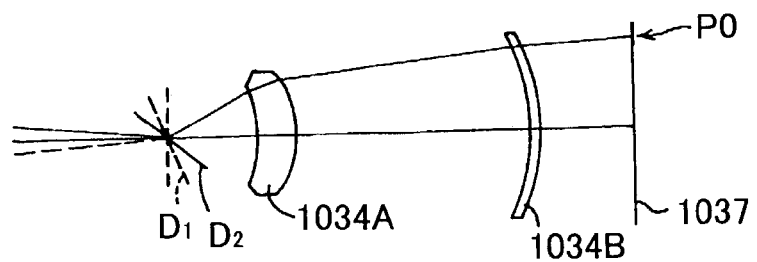

On the other hand, as shown in FIG. 14C, when the two light beams from the light source side cross in the main scanning direction in the vicinity of the reflection (deflection) surface, the light paths to the imaging position P0 on the scan surface 1037 become substantially the same with respect to the light beams represented by the solid line and the broken line. Hence, it is possible to effectively reduce scan line deflection. In addition, "variation of writing positions in the main scanning direction" of light beams, which is caused by variation of the size and shape of each component provided between the deflecting part 1005 and the scan surface 1037, is substantially the same amount among all light beams. Hence, it is possible to control write position shift in the main scanning direction among light beams.

Further, since all light beams focused on the same imaging position "pass substantially the same positions in the main scanning direction of the scanning and imaging lens", it is possible to reduce the influence of the aberration of the scanning lenses forming the scanning and imaging lens. Thus, it is possible to adjust the imaging position in the main scanning direction of each light beam with good accuracy. Accordingly, even when a delay time is set in common for all light beams after synchronization detection, it is possible to control the position shift in the main scanning direction with image height at the beginning of writing.

Additionally, in a case where a plurality of light beams cross in the main scanning direction in the vicinity of the reflection (deflection) surface, it is possible to minimize the size of the reflection (deflection) surface, thereby minimizing the radius of the inscribed circle of the rotary polygon mirror (deflecting part 1033).

In the embodiment shown in FIGS. 14A through 14C, the description is given of the case where the single scan surface 1037 is optically scanned by the multi-beam scanning method. However, as in the embodiment shown in FIGS. 13A through 13C, in the case where the light beams directed to respective scan surfaces are deflected by the same reflection (deflection) surface of the deflecting part, when "the light beams form an angle with each other in the main scanning direction with respect to the same reflection (deflection) surface" according to the light source side layout, similar effect can be obtained by crossing the light beams in the main scanning direction in the vicinity of the reflection (deflection) surface 105A of the polygon mirror 1005.

It is preferable that shift of intersection among the light beams be within 0.5 mm on the reflection (deflection) surface.

Figure 15:
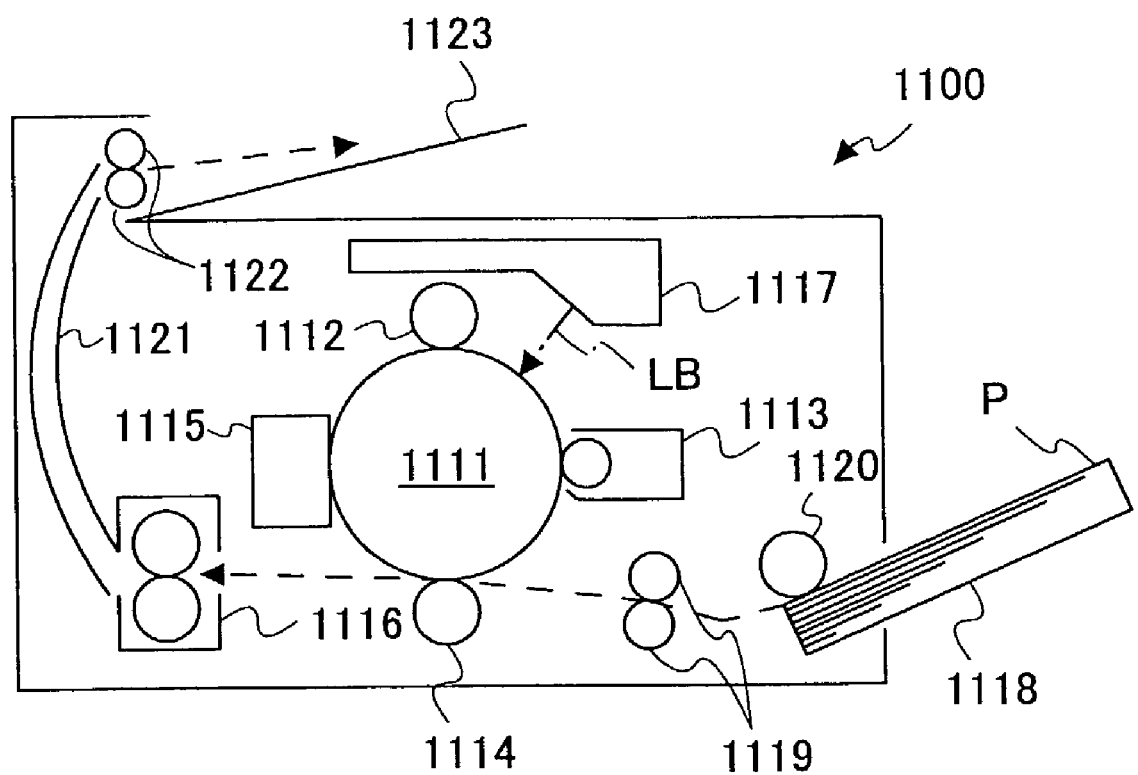
FIG. 15 is a schematic diagram showing one embodiment of the image forming apparatus using the optical scanning device shown in FIG. 12.

FIG. 15 shows a "laser printer" as one embodiment of an image forming apparatus using the optical scanning device of which embodiment is shown in FIG. 12.

A laser printer 1000 includes a photoconductor 1111, which is formed into a cylindrical shape, as a "photoconductive medium". A charging roller 1112 as charging means, a developing unit 1113, a transfer roller 1114 and a cleaning unit 1115 are arranged around the photoconductor 1111. A "corona charger" may be also used as the charging means.

Further, an optical scanning device 1117 that performs optical scanning by using a laser beam LB is provided so as to perform "exposure by optical writing" between the charging roller 1112 and the developing unit 1113.

In FIG. 15, reference numeral 1116 designates a fixing unit, reference numeral 1118 designates a cassette, reference numeral 1119 designates a resist roller pair, reference numeral 1120 designates a paper feeding roller, reference numeral 1121 designates a carrying path, reference numeral 1122 designates a paper delivering roller pair, reference numeral 1123 designates a tray, and reference numeral P designates transfer paper as a "sheet recording medium".

The "sheet recording medium" may be transfer paper, an OHP sheet (a plastic sheet for the over head projector) and the like.

When performing image forming, the photoconductors 1111 is rotated clockwise at a constant speed, and the surface thereof is uniformly charged by the charging roller 1112 and subjected to exposure by optical writing of the laser beam LB of the optical scanning device 1117. The formed electrostatic latent image is a so-called "negative latent image" and the image part is exposed. The electrostatic latent image is reversely developed by the developing unit 1113, and a toner image is formed on an image carrier (photoconductor) 1111.

The cassette 1118, which stores the transfer paper P, is detachable from the image forming apparatus body 1100. In an attached state as shown in FIG. 15, the top sheet of the stored transfer paper P is fed by the paper feeding roller 1120, and the fed transfer paper P is gripped by the resist roller pair 1119 at the top part thereof.

The resist roller pair 1119 sends the transfer paper P to a transfer part in the timing when the toner image on the photoconductors 1111 moves to a transfer position. The sent transfer paper P is superimposed with the toner image at the transfer part, and the toner image is electrostatically transferred thereon by an operation of the transfer roller 1114.

The transfer paper P on which the toner image is transferred is sent to the fixing unit 1116, and the toner image is fixed thereon in the fixing unit 1116. Then, the transfer paper P passes through the carrying path 1121 and is delivered onto the tray 1123 by the paper delivering roller pair 1122. The surface of the photoconductors 1111 after the transfer of the toner-image is cleaned by the cleaning unit 1115 so as to eliminate such as remaining toner and paper dust.

The optical scanning device as explained with reference to FIG. 12 is used as the optical scanning device 1117.

Figure 16:
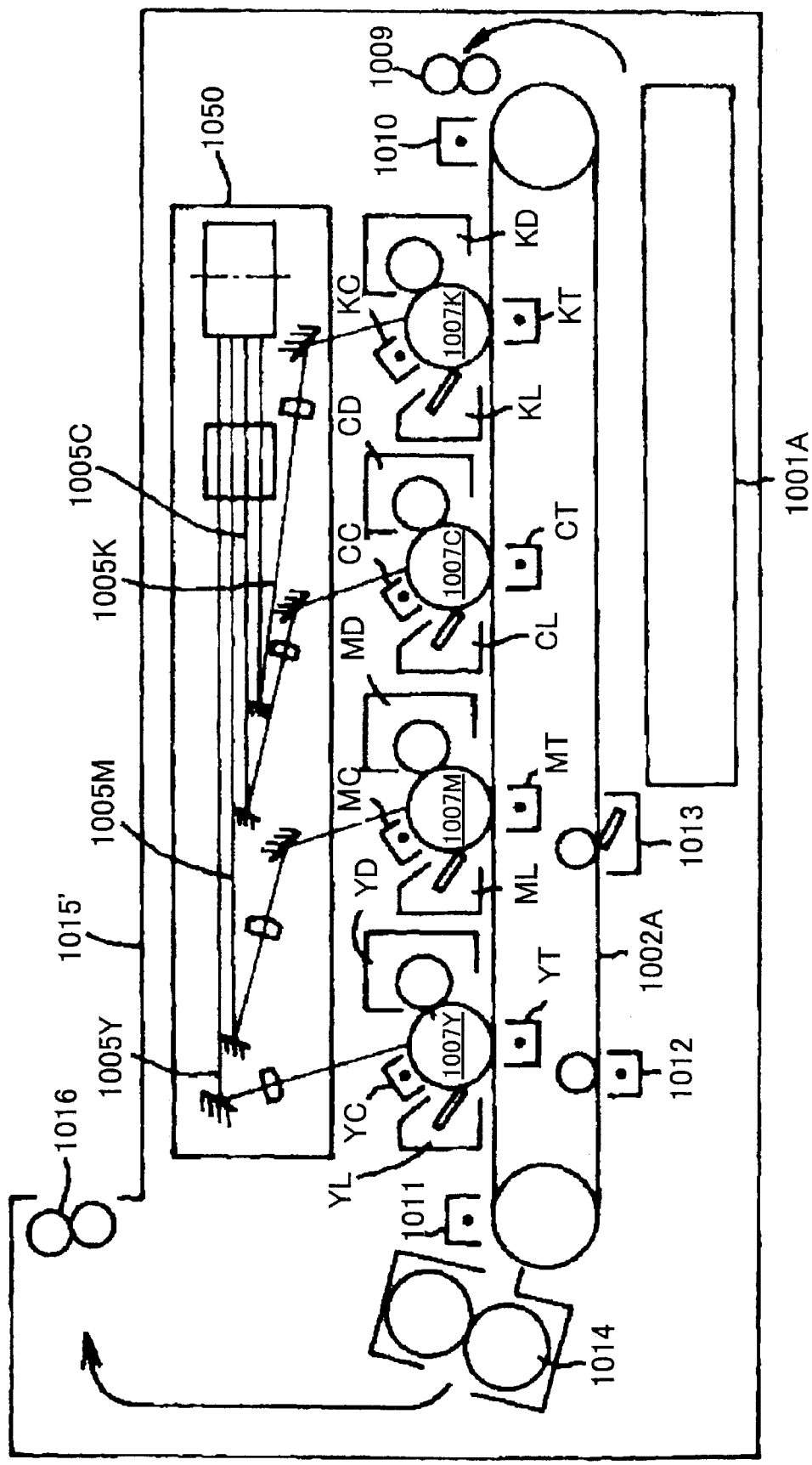
FIG. 16 is a schematic diagram showing one embodiment of the tandem-type image forming apparatus using the optical scanning device shown in FIGS. 13A through 13C.
Figure 17A:
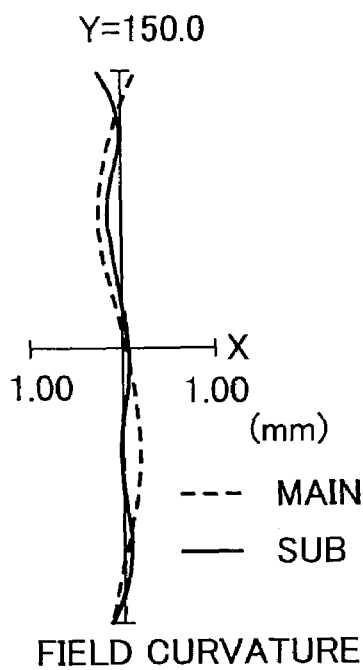
FIG. 17A is a graph of curvature field of Embodiment 6.
Figure 17B:
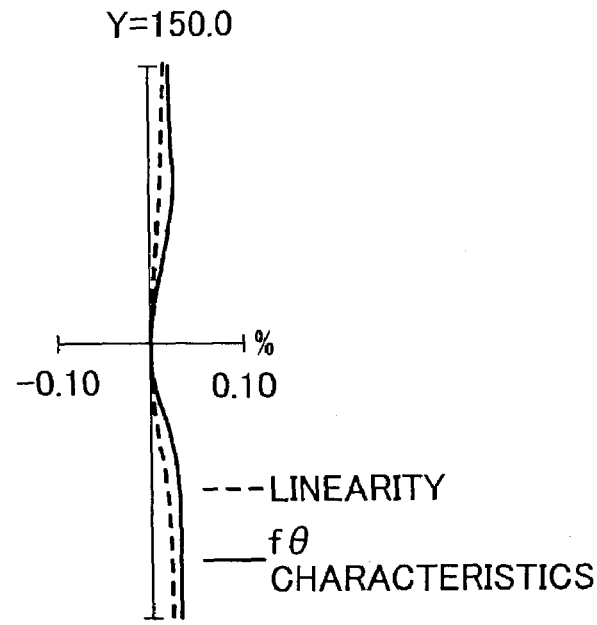
FIG. 17B is a graph of constant velocity characteristics of Embodiment 6.
Figure 18A:
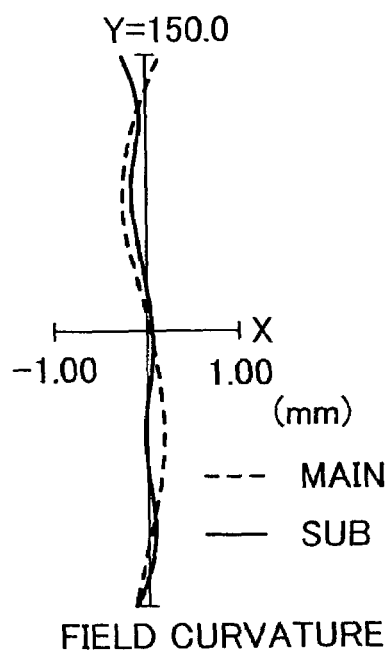
FIG. 18A is a graph of curvature field of Embodiment 7.
Figure 18B:
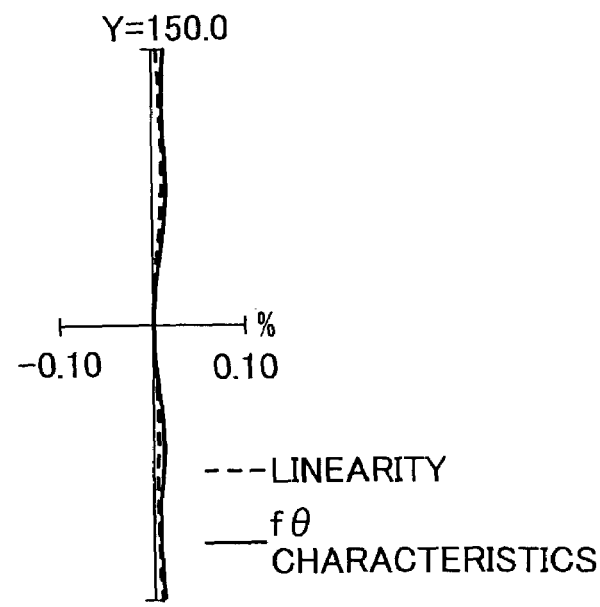
FIG. 18B is a graph of constant velocity characteristics of Embodiment 7.
Figure 19A:
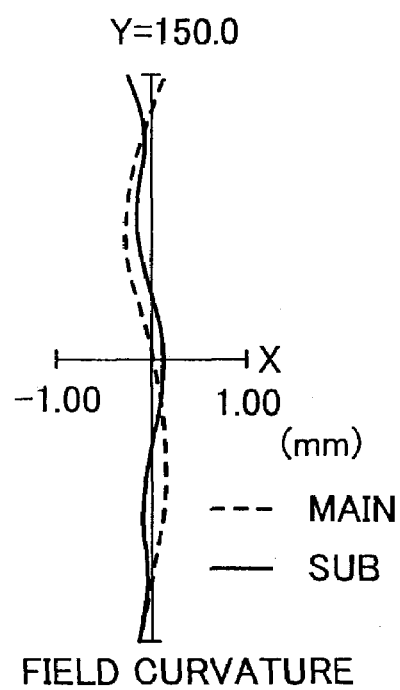
FIG. 19A is a graph of curvature field of Embodiment 8.
Figure 19B:
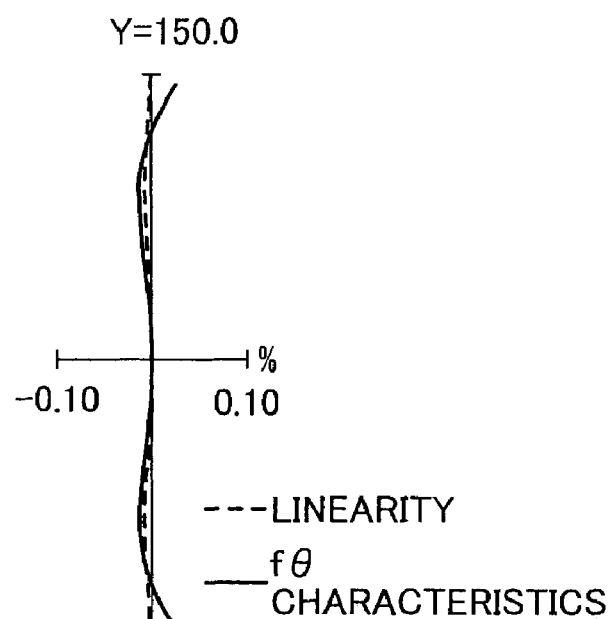
FIG. 19B is a graph of constant velocity characteristics of Embodiment 8.

FIG. 16 shows one embodiment of the "tandem-type color image forming apparatus" using the optical scanning device as previously explained with reference to FIGS. 13A through 13C. In FIG. 16, a part designated by reference numeral 1050 is the optical scanning device part explained in FIGS. 13A through 13C. Reference numerals 1005Y, 1005M, 1005C and 1005K designate deflected light beams that optically scan photoconductors 1007Y, 1007M, 1007C and 1007K, respectively.

Charging parts YC, MC, CC and KC, developing parts YD, MD, CD and KD, transferring parts YT, MT, CT and KT, cleaning parts YL, ML, CL and KL are arranged around the photoconductors 1007Y, 1007M, 1007C and 1007K, respectively. A carrying belt 2A is provided so as to contact the photoconductors 1007Y, 1007M, 1007C and 1007K.

The photoconductors 1007Y through 1007K are uniformly charged by the corresponding charging parts YC through KC while being rotated clockwise, and optically scanned by the corresponding light beams 1005Y through 1005K so that electrostatic latent images are written as negative latent images. These electrostatic latent images are developed by the developing units YD through KD, and toner images of yellow, magenta, cyan and black are formed on the photoconductors 1007Y, 1007M, 1007C and 1007K, respectively.

A transfer paper, which is a sheet recording medium on which a color image is formed, is fed from a cassette 1001A and placed on a carrying belt 1002A by resist rollers 1009. The carrying belt 1002A is charged through corona discharging by a charger 1010, and the transfer paper is electrostatically stuck onto the carrying belt 1002A.

A "black toner image", a "cyan toner image", a "magenta toner image" and a "yellow toner image" are sequentially transferred from the photoconductors 1007K, 1007C, 1007M and 1007Y by operations of the transferring parts KT through YT onto the transfer paper held by the carrying belt 1002A as described above while the transfer paper is sequentially carried to transfer parts.

In this way, a color image is synthetically formed on the transfer paper. The transfer paper having the color image thereon is discharged by a discharger 1011, separates from the carrying belt 1002A by its own elasticity, and proceeds to a fixing unit 1014. In the fixing unit 1014, the color image is fixed to the transfer paper, and the transfer paper is delivered onto a tray 1015'. The photoconductors 1007Y, 1007M, 1007C and 1007K are cleaned by the cleaning parts YL, ML, CL and KL, respectively.

That is, the image forming apparatus shown in FIG. 16 is an image forming apparatus arranging a plurality of photoconductors (photoconductors 1007Y through 1007K) as photoconductive media along the carrying path of a transfer medium (transfer paper), optically scanning the photoconductors so as to form electrostatic latent images thereon, making visible the electrostatic latent images as toner images of different colors, superimposing the toner images on the same sheet recording medium so as to transfer/fix the toner images thereto and obtain an image synthetically. In addition, the image forming apparatus shown in FIG. 16 is a tandem-type image forming apparatus having four photoconductors and forming a color image The number of the photoconductors may also be three.

The "transfer medium" may be an intermediate transfer medium such as an intermediate transfer belt as well as a sheet recording medium. In other words, the toner images formed on the respective photoconductors may be directly transferred to a sheet recording medium (direct transfer method), and also transferred to the sheet recording medium via the intermediate transfer belt (intermediate transfer method).

A description will be given of three specific embodiments of optical systems of the optical scanning device. The optical scanning devices as shown in FIGS. 12 and 13A through 13C are assumed for the optical scanning device.

Reference numerals used in the following description are as shown below.

RY: curvature radius of a surface (including surface of aperture) in main scanning direction RZ: curvature radius (on optical axis) of a surface (including surface of aperture) in sub scanning direction N: refraction factor of a material when a wavelength used is 780 nm X: distance in optical axis direction Y: distance in main scanning direction from optical axis X: distance in sub scanning direction from optical axis Embodiment 6

(Optical System on Light Source Side Before and Including Deflecting Part)

TABLE 4

| Surface No. | RY (mm) | RZ (mm) | X (mm) | N | Note |
|---|---|---|---|---|---|
| light source | — | — | 0.51 | — | semiconductor laser array |
| 1 | ∞ | ∞ | 0.3 | 1.511 | cover glass |
| 2 | ∞ | ∞ | 12.0 | — | — |
| 3* | 52.59 | 52.59 | 3.8 | 1.512 | coupling lens |
| 4* | −8.71 | −8.71 | 15.0 | — | — |
| 5 | ∞ | ∞ | 138.85 | — | aperture |
| 6 | ∞ | 48.0 | 3.0 | 1.511 | cylindrical lens |
| 7 | ∞ | ∞ | 93.57 | — | — |
| 8 | — | — | — | — | reflection surface |

In Table 4, the surfaces with "*" appended to their surface numbers are "coaxial aspheric surfaces". The numeric values of the aspheric surfaces are not shown, however, the numeric values thereof are set such that wave aberration of "parallel light beams" emitted from the coupling lens are substantially corrected. In addition, the deflecting part is a rotary polygon mirror having six reflection (deflection) surfaces and the diameter of the inscribed circle is 18 mm.

(Optical System After and Including Deflecting Part)

$\beta_0$ (imaging magnification on optical axis in sub-scanning direction between deflecting part and scan surface): 0.38 maximum value of $|\beta_h/\beta_0|$: 0.99

TABLE 5

| Surface No. | RY (mm) | RZ (mm) | X (mm) | N | Note |
|---|---|---|---|---|---|
| 0 | ∞ | ∞ | 68.0 | — | reflection surface |
| 1* | 1897.948 | ∞ | 31.4 | 1.524 | scanning lens |
| 2* | −151.350 | ∞ | 162.0 | — | — |
| 3** | −4430.699 | −88.519 | 8.2 | 1.524 | scanning lens |
| 4** | −4584.974 | −27.015 | 100.0 | — | — |
| 5 | — | — | — | — | scan surface |

In Table 5, each of the surfaces with "*" appended to their surface numbers is formed in an aspheric shape in a main scanning cross section, and formed in a straight line in a sub-scanning cross section. The lens surface thereof is expressed with the following equation (3):

$$X(Y, Z) = Y^2 \cdot Cm \Big/ \left[1 + \sqrt{1 - (1 + K) \cdot (Y \cdot Cm)^2}\right] + A \cdot Y^4 + B \cdot Y^6 + C \cdot Y^8 + D \cdot Y^{10} + E \cdot Y^{12} + \quad \text{equation (3)}$$

-continued $$Cs(Y) \cdot Z^2 / \left[1 + \sqrt{\{1 - (Cs(Y) \cdot Z)^2\}}\,\right],$$

where Cm=1/RY and Cs(Y)=1/RZ.

Each of the surfaces with "**" appended to their surface numbers is formed in an aspheric shape in the main scanning direction, and is a surface of which curvature radius in the sub-scanning direction is continuously varied in accordance with the height (Y) in the main scanning direction of the lens. The shape of each of the surfaces is expressed by the above-described equation (3), where "Cs(Y)" in equation (3) is as follows.

$$Cs(Y) = 1/RZ + a \cdot Y + b \cdot Y^2 + c \cdot Y^3 + d \cdot Y^4 + \quad \text{equation (4)}$$
$$e \cdot Y^5 + f \cdot Y^6 + g \cdot Y^7 + h \cdot Y^8 + i \cdot Y^9 +$$
$$j \cdot Y^{10} + k \cdot Y^{11} + 1 \cdot Y^{12}$$

The coefficients of the aspheric surfaces in Embodiment 6 are as shown in Table 6.

TABLE 6

|   | 1st surface | 2nd surface | 3rd surface | 4th surface |
|---|---|---|---|---|
| RY | 1897.948 | −151.350 | −4430.699 | −4584.974 |
| K | 8.680E − 02 | −2.892E − 01 | −5.249E + 02 | −3.313E + 02 |
| A | −2.362E − 08 | 1.415E − 08 | 7.160E − 09 | −6.342E − 09 |
| B | −5.964E − 14 | −1.950E − 12 | −1.772E − 13 | 1.330E − 13 |
| C | 8.232E − 17 | −2.372E − 16 | 1.104E − 18 | −1.838E − 18 |
| D | 1.569E − 20 | 2.083E − 20 | −1.639E − 22 | −1.733E − 22 |
| E | 3.315E − 24 | 3.903E − 24 | −3.107E − 29 | 3.743E − 29 |
| RZ | ∞ | ∞ | −88.519 | −27.015 |
| a | — | — | — | −2.440E − 07 |
| b | — | — | −1.435E − 07 | 1.197E − 07 |
| c | — | — | — | 1.325E − 11 |
| d | — | — | 5.793E − 13 | −4.423E − 12 |
| e | — | — | — | −3.179E − 15 |
| f | — | — | −6.428E − 17 | −2.276E − 16 |
| g | — | — | — | 1.535E − 19 |
| h | — | — | −3.700E − 21 | 5.299E − 22 |
| i | — | — | — | 1.276E − 23 |
| j | — | — | −1.126E − 25 | −4.801E − 26 |
| k | — | — | — | −7.059E − 28 |
| l | — | — | −9.704E − 30 | −4.770E − 30 |

In Table 6, the exponential expression "E−30" denotes "$10^{-30}$", for example, and the numeric value preceding such exponential expression is multiplied by the exponential expression.

In this optical system, a soundproof glass having a thickness of 1.9 mm (refraction factor: 1.511) is arranged between the cylindrical lens and the deflecting part at an angle of 8° with respect to the sub-scanning direction.

Embodiment 7

(Optical System on Light Source Side Before and Including Deflecting Part)

The same optical system as that in Embodiment 6.

(Optical System After and Including Deflecting Part)

$\beta_0$ (imaging magnification on optical axis in sub-scanning direction between deflecting part and scan surface): 0.38 maximum value of $|\beta_h/\beta_0|$: 0.99

TABLE 7

| Surface No. | RY (mm) | RZ (mm) | X (mm) | N | Note |
|---|---|---|---|---|---|
| 0 | ∞ | ∞ | 68.0 | — | reflection surface |
| 1* | 1898.537 | ∞ | 31.4 | 1.524 | scanning lens |
| 2* | −151.277 | ∞ | 162.0 | — | — |
| 3** | −4100.699 | −88.511 | 8.2 | 1.524 | scanning lens |
| 4** | −4584.974 | −27.015 | 100.0 | — | — |
| 5 | — | — | — | — | scan surface |

The shape of each of the surfaces appended with "*" and "**" is expressed by equation (3) or equation (3) using equation (4) as in the Embodiment 6.

The coefficients of the aspheric surfaces in Embodiment 7 are as shown in Table 8.

TABLE 8

|   | 1st surface | 2nd surface | 3rd surface | 4th surface |
|---|---|---|---|---|
| RY | 1898.537 | −151.277 | −4100.699 | −4584.974 |
| K | 8.080E − 00 | −2.909E − 01 | −4.657E + 02 | −2.719E + 02 |
| A | −2.367E − 08 | 1.423E − 08 | 7.146E − 09 | −6.327E − 09 |
| B | −6.495E − 14 | −1.942E − 12 | −1.775E − 13 | 1.333E − 13 |
| C | 8.216E − 17 | −2.364E − 16 | 1.100E − 18 | −1.833E − 18 |
| D | 1.586E − 20 | 2.089E − 20 | −1.639E − 22 | −1.733E − 22 |
| E | 3.433E − 24 | 3.898E − 24 | −3.560E − 29 | 3.268E − 29 |
| RZ | ∞ | ∞ | −88.519 | −27.015 |
| a | — | — | — | −2.085E − 07 |
| b | — | — | −1.439E − 07 | 1.201E − 07 |
| c | — | — | — | 1.327E − 11 |
| d | — | — | 5.437E − 13 | −4.400E − 12 |
| e | — | — | — | −3.763E − 15 |
| f | — | — | −6.670E − 17 | −2.269E − 16 |
| g | — | — | — | 1.516E − 19 |
| h | — | — | −3.762E − 21 | 5.826E − 22 |
| i | — | — | — | 1.263E − 23 |
| j | — | — | −1.132E − 25 | −4.732E − 26 |
| k | — | — | — | −7.097E − 28 |
| l | — | — | −9.544E − 30 | −4.880E − 30 |

Also in this optical system, a soundproof glass having a thickness of 1.9 mm (refraction factor: 1.511) is arranged between the cylindrical lens and the deflecting part at an angle of 8° with respect to the sub-scanning direction.

Embodiment 8

(Optical System on Light Source Side Before and Including Deflecting Part)

The same optical system as that in Embodiment 6.

(Optical System After and Including Deflecting Part)

$\beta_0$ (imaging magnification on optical axis in sub-scanning direction between deflecting part and scan surface): 0.38 maximum value of $|\beta_h/\beta_0|$: 0.99

TABLE 9

| Surface No. | RY (mm) | RZ (mm) | X (mm) | N | Note |
|---|---|---|---|---|---|
| 0 | ∞ | ∞ | 68.0 | — | reflection surface |
| 1* | 1900.703 | ∞ | 31.4 | 1.524 | scanning lens |
| 2* | −151.109 | ∞ | 162.0 | — | — |
| 3** | −3500.699 | −88.468 | 8.2 | 1.524 | scanning lens |
| 4** | −4584.974 | −27.016 | 100.0 | — | — |
| 5 | — | — | — | — | scan surface |

The shape of each of the surfaces appended with "*" and "**" is expressed by equation (3) or equation (3) using equation (4) as in the Embodiment 6.

The coefficients of the aspheric surfaces in the Embodiment 8 are as shown in Table 10.

TABLE 10

|    | 1st surface  | 2nd surface  | 3rd surface  | 4th surface  |
|----|--------------|--------------|--------------|--------------|
| RY | 1900.703     | −151.109     | −3500.699    | −4584.974    |
| K  | −2.559E + 01 | −2.916E − 01 | −5.852E + 02 | −4.187E + 02 |
| A  | −2.362E − 08 | 1.432E − 08  | 7.071E − 09  | −6.248E − 09 |
| B  | −3.061E − 14 | −1.965E − 12 | −1.788E − 13 | 1.347E − 13  |
| C  | 8.757E − 17  | −2.424E − 16 | 1.096E − 18  | −1.825E − 18 |
| D  | 1.526E − 20  | 2.014E − 20  | −1.632E − 22 | −1.739E − 22 |
| E  | 2.719E − 24  | 3.969E − 24  | 1.212E − 29  | 1.262E − 29  |
| RZ | ∞            | ∞            | −88.468      | −27.016      |
| a  | —            | —            | —            | −1.278E − 07 |
| b  | —            | —            | −1.447E − 07 | 1.209E − 07  |
| c  | —            | —            | —            | 1.454E − 11  |
| d  | —            | —            | 4.630E − 13  | −4.339E − 12 |
| e  | —            | —            | —            | −4.166E − 15 |
| f  | —            | —            | −7.411E − 17 | −2.250E − 16 |
| g  | —            | —            | —            | 1.256E − 19  |
| h  | —            | —            | −3.948E − 21 | 7.534E − 22  |
| i  | —            | —            | —            | 1.262E − 23  |
| j  | —            | —            | −1.104E − 25 | −4.876E − 26 |
| k  | —            | —            | —            | −6.184E − 28 |
| l  | —            | —            | −8.419E − 30 | −5.695E − 30 |

Also in this optical system, a soundproof glass having a thickness of 1.9 mm (refraction factor: 1.511) is arranged between the cylindrical lens and the deflecting part at an angle of 8° with respect to the sub-scanning direction.

FIGS. 17A and 17B, 18A and 18B, and 19A and 19B are pairs of graphs of the curvature field and the constant velocity characteristics (fθ characteristics/linearity) relating to the Embodiments 6, 7 and 8, respectively. As is clear from these graphs, the Embodiments 6 through 8 show significantly good performance Each of the scanning and imaging lenses of the optical systems according to the Embodiments 1 through 3 is used in an optical scanning device including a deflecting part deflecting light beams from a light source and a scanning and imaging lens directing the light beams deflected by the deflecting part to a scan surface and focusing the light beams onto the scan surface as a beam spot. The above-described scanning and imaging lens is formed by two-scanning lenses. The scanning lens of the two scanning lenses nearer to the deflecting part possesses a positive refracting power in the main scanning direction and a refracting power of zero in the sub-scanning direction. The scanning lens of the two scanning lens nearer to the scan surface possesses a negative refracting power in the main scanning direction and a positive refracting power in the sub-scanning direction. In addition, the scanning lens of the two scanning lenses nearer to the scan surface is formed in a "negative meniscus shape in a main scanning cross section having a convex part (surface) facing the scan surface". The scanning lens nearer to the scan surface include functions of forming a geometrically-optically substantially conjugate relationship between the point of deflection of the deflecting part and the scan surface with respect to the sub-scanning direction, and in this scanning lens, conditions:

$$0.9 < |\beta_h/\beta_0| < 1.1 \quad (5)$$

$$0.2 < |\beta_0| < 0.6 \quad (6)$$

are satisfied, where $\beta_0$ is the lateral magnification in the sub-scanning direction on the optical axis between the deflecting part and the scan surface, and $\beta_h$ is the lateral magnification in the sub-scanning direction at an arbitrary image height between the deflecting part and the scan surface.

Further, a condition:

$$0.3 < |a/L| < 0.6 \quad (7)$$

is satisfied, where L is the distance on the optical axis from the point of deflection of the deflecting part to the scan surface, and a is the maximum distance on the optical axis between lenses among a plurality of scanning lenses. The two scanning lenses forming the scanning and imaging lens are both plastic lenses.

Accordingly, it is possible to perform a good correction especially on a curvature field in the sub-scanning direction by providing functions of achieving constant velocity characteristics such as fθ characteristics to the "scanning lens nearest to the deflecting part", and providing imaging functions in the sub-scanning direction mainly to the "scanning lens nearest to the scan surface". In addition, since the imaging functions in the sub-scanning direction are provided to the scanning lens nearest to the scan surface, the imaging magnification in the sub-scanning direction is decreased, a beam spot having a small diameter can be achieved, and variation in the magnification depending on the image height is easily corrected.

Additionally, in the optical scanning device, the scanning and imaging lens is formed by two scanning lenses, and the scanning lens of the two scanning lenses nearer to the scan surface is formed in the "negative meniscus shape having a convex part facing the scan surface in a main scanning cross section". Hence, it is easy to maintain the optical magnification to be constant with respect to the image height.

In a case where at least two surfaces in the sub-scanning direction are formed into the "surfaces in which the curvature radius in the sub-scanning cross section is varied in the main scanning direction so that a line of center of curvature formed by lining centers of curvature in the sub-scanning cross sections becomes a curved line that is different from the aspheric shape in the main scanning direction in the main scanning cross section", and "the principle points in the sub-scanning direction are adjusted" by bending the two lens surfaces, the wider the interval between the two surfaces, the greater the variation of the principle points can be. Hence, the lateral magnification in the sub-scanning direction can be easily corrected among the image heights.

Further, in the optical scanning device, in terms of reducing the cost, the scanning and imaging lens includes two scanning lenses, and the scanning lens nearest to the deflecting part possesses a substantially zero refracting power in the sub-scanning direction. Thus, the two surfaces form the first and second surfaces of the scanning lens nearest to the scan surface. By forming the surfaces into the "negative meniscus shape having the convex part facing the scan surface" in the main scanning cross section, it is possible to make the interval between the two surfaces larger as being distant from the optical axis, facilitate the "adjustment of the principle point in the sub-scanning direction on the peripheral side", and effectively reduce the variation in the imaging magnification in the sub-scanning direction with respect to the image height of the beam spot.

That is, since the optical path length of the peripheral image height is longer than that of the center image height, in order to maintain the lateral magnification in the sub-scanning direction to be constant irrespective of the image height, it is necessary that-the principle point position of the peripheral image height be located nearer to the deflecting part than that of the center image height. In order to achieve this, the concave side of the negative meniscus shape is made to face the scan surface, and the principle point of the peripheral image height is configured to be able to be positioned nearer to the deflecting part with respect to the center image height. Further, the first and second surfaces of the scanning lens nearest to the scan surface are formed into the "surfaces in which the curvature radius in the sub-scanning cross section is varied in the main scanning direction so that a line of center of curvature formed by lining centers of curvature in the sub-scanning cross sections becomes a curved line that is different from the aspheric shape in the main scanning direction in the main scanning cross section". In addition, the two lens surfaces are curved so as to "adjust the principle position in the sub-scanning direction". Thereby, it is possible to make the optical magnification to be substantially constant with respect to the image height.

Additionally, Condition (5) represents a "desirable range" in the effective scan area of the imaging magnification in the sub-scanning direction of the scanning and imaging lens. When being beyond the range, the variation of the spot diameter of the beam spot is increased in the effective scan area, and a formed image is affected. By satisfying Condition (5), even when the multi-beam scanning method is used, it is possible to maintain the pitch among a plurality of scan lines to be constant. Thus, it is possible to correspond to higher density and higher speed optical scanning using multi-beams.

When exceeding the lower limit of Condition (6), in a case where the lateral magnification $\beta_0$ in the sub-scanning direction on the optical axis between the deflecting part and the scan surface is set greater with respect to a target spot diameter, it is necessary to set the diameter of the opening of the aperture for beam forming small. Accordingly, problems of inadequate light and deterioration of the spot diameter due to the influence of diffraction of the aperture tend to occur. When exceeding the upper limit of Condition (6), the interval between the scanning lens nearest to the deflecting part and the scan surface is increased, which is prone to give rise to a larger image forming apparatus.

For example, in a case where a tandem-type image forming apparatus sharing the deflecting part is constructed, mirrors for separating the light paths to the respective scan surfaces corresponding to respective colors are arranged within the interval on the optical axis that is largest among a plurality of scanning lenses. In such a case, when exceeding the lower limit of Condition (7), the interval on the optical axis largest among the plurality of scanning lenses becomes too short. Thus, the arrangement of such as the mirrors for separating the light paths becomes difficult.

In addition, when exceeding the upper limit of Condition (7), the scanning lens nearer to the deflecting part approaches to the deflecting part. Since this scanning lens possesses a strong positive refracting power, the angle of view for optically scanning the effective scan area on the scan surface becomes narrow. Thus, the scan time becomes shorter compared to a case where the angle of view is wide. Accordingly, there is a possibility that the speed of response of ON/OFF of such as an LD used for the light source cannot correspond to the writing density.

When a plastic lens is used for the scanning lens, it is possible to manufacture the scanning lens at a low cost and also to easily form a complex surface shape such as an aspheric surface. On the other hand, the optical characteristics of a plastic lens are apt to be varied in accordance with such as temperature change. Specifically, in a polygon mirror, for example, which is generally used as the deflecting part, the ambient temperature tends to be increased by the heat generation of the drive motor rotating such as the polygon mirror.

When the scanning lens nearer to the deflecting part is a plastic lens, temperature change tends to occur due to the influence of the heat generation of the drive motor. Thus, in the tandem-type color image forming apparatus using a different scanning and imaging lens for each photoconductor, color shift and hue variation tend to occur in a composite color image since the "variation in the constant velocity characteristics due to the temperature change" of the scanning and imaging lens is different from lens (scanning and imaging lens) to lens. However, when the scanning lens (including the functions of correcting the constant velocity characteristics) nearest to the deflecting part is "shared in common by the plurality of light beams directed to the respective (different) scan surfaces", the variation in the constant velocity characteristics occurs in the same way for each color. Hence, the occurrence of color shift and hue variation is controlled.

The present invention is not limited to the specifically disclosed embodiments, and variations and modifications may be made without departing from the scope of the present invention.

The present application is based on Japanese priority applications No. 2002-063129 filed on Mar. 8, 2002 and No. 2002-276314 filed on Sep. 20, 2002, the entire contents of which are hereby incorporated by reference.

What is claimed is:

1. An optical scanning device, comprising:
   a plurality of light sources emitting a plurality of groups of light beams;
   an optical deflecting part deflecting the plurality of groups of light beams emitted from the plurality of light sources;
   a plurality of scan surfaces to be optically scanned; and
   a scanning and imaging optical system directing the groups of deflected light beams to said respective scan surfaces so as to optically scan said scan surfaces,
   each of the groups of light beams deflected by said optical deflecting part passes through at least two scanning lenses while being directed to a corresponding one of the scan surfaces,
   a first scanning lens arranged nearest to said optical deflecting part among said scanning lenses transmits the plurality of groups of light beams directed to the respective scan surfaces and satisfies Pm>0≧Ps, where Pm is a power in a main scanning direction of said first scanning lens and Ps is a power in a sub-scanning direction of said first scanning lens, and
   a second scanning lens arranged nearest to the corresponding scan surface among said scanning lenses possesses a positive power in the subs-canning direction and transmits only one of the groups of light beams directed to the corresponding scan surface.

2. The optical scanning device as claimed in claim 1, wherein |(1/Rs1)+(1/Rs2)|·L<0.5 is satisfied where Rs1 is a radius of curvature in the sub-scanning direction of an entering surface of the first scanning lens, Rs2 is a radius of curvature in the sub-scanning direction of an exiting surface of the first scanning lens, and L is an optical path length from a point of deflection of the optical deflecting part to an arbitrary one of the scan surfaces.

3. The optical scanning device as claimed in claim 2, wherein |(1/Rm1)+(1/Rm2)|·L<0.1 is satisfied where Rm1 is a radius of curvature in the main scanning direction of an entering surface of the second scanning lens, Rm2 is a radius of curvature in the main scanning direction of an exiting surface of the second scanning lens, and L is the optical path length from the point of deflection of the optical deflecting part to the arbitrary one of the scan surfaces.

4. The optical scanning device as claimed in claim 1, wherein |(1/Rm1)+(1/Rm2)|·L<0.1 is satisfied where Rm1 is a radius of curvature in the main scanning direction of an entering surface of the second scanning lens, Rm2 is a radius of curvature in the main scanning direction of an exiting surface of the second scanning lens, and L is an optical path length from a point of deflection of the optical deflecting part to an arbitrary one of the scan surfaces.

5. The optical scanning device as claimed in claim 1, wherein each of the groups of light beams deflected by the optical deflecting part is directed to the corresponding scan surface by only two scanning lenses,
one of said two scanning lenses is arranged nearer to the optical deflecting part, possesses a positive power only in the main scanning direction, and transmits the groups of light beams directed to the respective scan surfaces, and
the other of said two scanning lenses is arranged nearer to the corresponding scan surface, possesses a positive power in the sub-scanning direction, and transmits one of the groups of light beams directed to the corresponding scan surface.

6. An optical scanning device, comprising:
a plurality of light sources emitting a plurality of groups of light beams;
a deflecting part deflecting the groups of light beams emitted from the light sources;
a plurality of scan surfaces to be optically scanned; and
a scanning and imaging optical system directing the groups of deflected light beams to said respective scan surfaces so as to optically scan said scan surfaces,
said scanning and imaging optical system comprising:
a first type scanning lens satisfying Pm>0≧Ps, where Pm is a power in a main scanning direction of said first type scanning lens and Ps is a power in a sub-scanning direction of said first type scanning lens, and transmitting the groups of light beams directed to said respective scan surfaces; and
a second type scanning lens having a positive power in the sub-scanning direction and transmitting one of the groups of light beams directed to a corresponding one of said scan surfaces,
wherein all scanning lenses arranged on light paths from said optical deflecting part to said scan surfaces are one of said first and second type scanning lenses.

7. The optical scanning device as claimed in claim 6, wherein |(1/Rs1)+(1/Rs2)|·L<0.5 is satisfied where Rs1 is a radius of curvature in the sub-scanning direction of an entering surface of the first type scanning lens, Rs2 is a radius of curvature in the subs-canning direction of an exiting surface of the first type scanning lens, and L is an optical path length from a point of deflection of the optical deflecting part to an arbitrary one of the scan surfaces.

8. The optical scanning device as claimed in claim 7, wherein |(1/Rm1)+(1/Rm2)|·L<0.1 is satisfied where Rm1 is a radius of curvature in the main scanning direction of an entering surface, of the second type scanning lens, Rm2 is a radius of curvature in the main scanning direction of an exiting surface of the second scanning lens, and L is the optical path length from the point of deflection of the optical deflecting part to the arbitrary one of the scan surfaces.

9. The optical scanning device as claimed in claim 6, wherein |(1/Rm1)+(1/Rm2)|·L<0.1 is satisfied where Rm1 is a radius of curvature in the main scanning direction of an entering surface of the second type scanning lens, Rm2 is a radius of curvature in the main scanning direction of an exiting surface of the second type scanning lens, and L is an optical path length from a point of deflection of the optical deflecting part to an arbitrary one of the scan surfaces.

10. An image forming apparatus forming an image by optically scanning one or more photosensitive medium, comprising:
an optical scanning device, comprising:
a plurality of light sources emitting a plurality of groups of light beams;
an optical deflecting part deflecting the groups of light beams emitted from the light sources;
a plurality of scan surfaces to be optically scanned; and
a scanning and imaging optical system directing the groups of deflected light beams to said respective scan surfaces so as to optically scan said scan surfaces,
each of the groups of light beams deflected by said optical deflecting part passes through at least two scanning lenses while being directed to a corresponding one of the scan surfaces,
a first scanning lens arranged nearest to said optical deflecting part among said scanning lenses transmits the groups of light beams directed to the respective scan surfaces and satisfies Pm>0≧Ps, where Pm is a power in a main scanning direction of said first scanning lens and Ps is a power in a sub-scanning direction of said first scanning lens; and
a second scanning lens arranged nearest to the corresponding scan surface among said scanning lenses possesses a positive power in the sub-scanning direction and transmits only one of the groups of light beams directed to the corresponding scan, surface.

11. An image forming apparatus forming an image by optically scanning one or more photosensitive medium, comprising:
an optical scanning device, comprising:
a plurality of light sources emitting a plurality of groups of light beams;
a deflecting part deflecting the groups of light beams emitted from the light sources;
a plurality of scan surfaces to be optically scanned; and
a scanning and imaging optical system directing the groups of deflected light beams to said respective scan surfaces so as to optically scan said scan surfaces,
said scanning and imaging optical system comprising:
a first type scanning, lens satisfying Pm>0≧Ps, where Pm is a power in a main scanning direction of said first type scanning; lens and Ps is a power in a sub-scanning direction of said first type scanning lens, and transmitting the groups of light beams directed to said respective scan surfaces; and
a second type scanning lens having a positive power in the sub-scanning direction and transmitting one of the groups of light beams directed to a corresponding one of said scan surfaces,
wherein all scanning lenses arranged on light paths from said optical deflecting part to said scan surfaces are one of said first and second type scanning lenses.

* * * * *